(12) United States Patent
Zage et al.

(10) Patent No.: US 10,027,698 B2
(45) Date of Patent: Jul. 17, 2018

(54) NETWORK PROTECTION SYSTEM USING LINKOGRAPHS

(71) Applicant: National Technology & Engineering Solutions of Sandia, LLC, Albuquerque, NM (US)

(72) Inventors: David John Zage, Fremont, CA (US); John Charles Jarocki, Albuquerque, NM (US); Andrew N. Fisher, Albuquerque, NM (US); Carson Kent, Stanford, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 242 days.

(21) Appl. No.: 14/975,502

(22) Filed: Dec. 18, 2015

(65) Prior Publication Data

US 2017/0180407 A1    Jun. 22, 2017

(51) Int. Cl.
*H04L 29/06* (2006.01)

(52) U.S. Cl.
CPC ...... *H04L 63/1433* (2013.01); *H04L 63/0421* (2013.01); *H04L 63/1441* (2013.01); *H04L 63/20* (2013.01)

(58) Field of Classification Search
CPC ............. H04L 63/0421; H04L 63/1433; H04L 63/1441; H04L 63/20
See application file for complete search history.

(56) References Cited

U.S. PATENT DOCUMENTS

| | | | | |
|---|---|---|---|---|
| 5,991,881 A | * | 11/1999 | Conklin | H04L 41/00 709/224 |
| 7,624,448 B2 | * | 11/2009 | Coffman | G06F 21/552 726/22 |
| 8,813,234 B1 | * | 8/2014 | Bowers | G06F 21/552 726/25 |
| 8,880,435 B1 | * | 11/2014 | Catlett | G06Q 20/10 705/75 |
| 8,881,288 B1 | * | 11/2014 | Levy | G06F 21/577 709/225 |
| 9,722,895 B1 | * | 8/2017 | Sarukkai | H04L 43/045 |
| 2007/0226796 A1 | * | 9/2007 | Gilbert | G06F 21/55 726/22 |
| 2010/0058456 A1 | * | 3/2010 | Jajodia | G06F 21/552 726/11 |

(Continued)

OTHER PUBLICATIONS

Kan et al., Entropy Measurement of Linkography in Protocol Studies of Designing, JS Gero and N Bonnardel (eds), Studying Designers'05, 2005 Key Centre of Design Computing and Cognition, University of Sydney, pp. 229-245.*

*Primary Examiner* — Khang Do
(74) *Attorney, Agent, or Firm* — Yee & Associates, P.C.

(57) ABSTRACT

A method and apparatus for managing an attack on a computer system. A computer identifies actions taken by an adversary in the computer system and links connecting the actions over time using an ontology defining linking rules for linking the actions over time. The computer creates a graph of the actions with the links connecting the actions over time. The graph shows a number of patterns of behavior for the adversary. The computer then identifies a protective action to take with respect to the computer system using the graph of the actions taken by the adversary.

24 Claims, 21 Drawing Sheets

(56) References Cited

U.S. PATENT DOCUMENTS

2013/0219503 A1\* 8/2013 Amnon ................... G06F 21/55
 726/25
2013/0318616 A1\* 11/2013 Christodorescu ....... G06F 21/00
 726/25
2016/0330226 A1\* 11/2016 Chen ................... H04L 63/1416

\* cited by examiner

| SUB-LINKOGRAPH | PERCENTAGE OF LINKS |
|---|---|
| $SL(0,2)$ | 66.67% |
| $SL(0,5)$ | 60.00% |
| $SL(0,6)$ | 66.67% |
| $SL(0,7)$ | 67.86% |
| $SL(2,6)$ | 60.00% |
| $SL(2,7)$ | 60.00% |
| $SL(3,5)$ | 66.67% |
| $SL(3,6)$ | 66.67% |
| $SL(3,7)$ | 60.00% |
| $SL(4,6)$ | 66.67% |
| $SL(9,13)$ | 60.00% |
| $SL(9,18)$ | 60.00% |
| $SL(10,12)$ | 66.67% |
| $SL(10,13)$ | 66.67% |
| $SL(10,18)$ | 61.11% |
| $SL(11,13)$ | 66.67% |
| $SL(11,18)$ | 60.71% |
| $SL(13,17)$ | 60.00% |
| $SL(13,18)$ | 60.00% |
| $SL(14,16)$ | 66.67% |
| $SL(14,17)$ | 66.67% |
| $SL(14,18)$ | 60.00% |
| $SL(15,17)$ | 66.67% |
| ALL SUB-LINKOGRAPHS WITH AT LEAST THREE NODES WITH A PERCENTAGE OF LINKS OF AT LEAST 0.6 | |

| NODE | BACK LINK PERCENT |
|---|---|
| 1 | 100.00% |
| 5 | 100.00% |
| 6 | 83.33% |
| 7 | 71.43% |
| 12 | 91.67% |
| 13 | 84.62% |
| 16 | 93.75% |
| 17 | 88.24% |
| 18 | 83.33% |
| HIGH BACK LINK PERCENTAGE NODES | |

FIG. 24

| SUB-LINKOGRAPH | SHANNON ENTROPY |
|---|---|
| $SL(0,3)$ | 1.00 |
| $SL(2,5)$ | 1.00 |
| $SL(4,7)$ | 1.00 |
| $SL(9,12)$ | 1.00 |
| $SL(13,16)$ | 1.00 |
| $SL(15,18)$ | 1.00 |
| SUB-LINKOGRAPHS WITH AT LEAST THREE NODES WHERE THE VALUE OF SHANNON ENTROPY IS 1 | |

FIG. 25

NETWORK PROTECTION SYSTEM USING LINKOGRAPHS

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved computer system and to a method and apparatus for protecting a computer system. Specifically, the present disclosure relates to a method and apparatus for analyzing cyber-attacks on a computer system using linkographs.

2. Background

Many organizations employ computer networks in day-to-day activities. These activities include activities such as payroll, human resources, research, sales, marketing, and other suitable activities. These types of activities often include connectivity of internal computer networks of the organization to the outside world through the Internet.

More and more often, computer networks in organizations are attacked and compromised by adversaries. The adversaries may steal information about customers, transactions, research, or other confidential or sensitive information. In other cases, adversaries may take actions that hinder the ability of the organization to perform operations or may hijack computers for other uses.

In protecting computer networks from adversaries, various tools are currently present for use by organizations. These tools include signature-based detectors, whitelisting, blacklisting, intrusion detection and protection systems, and other suitable types of tools. Actions that may be taken using these types of tools include, for example, unplugging compromised hosts, quarantining compromised hosts, and other suitable actions.

With the increasing frequency of attacks by adversaries and the increasing sophistication of adversaries, organizations are often unable to prevent or mitigate every type of attack that may occur. Further, organizations are often unable to protect their computer networks from intrusions by adversaries.

With this environment, organizations operate knowing that unauthorized intrusions and breaches of security in computer networks will occur. As a result, obtaining information about the tactics, techniques, and protocols used by adversaries may be useful in mitigating damage that may be caused by an unauthorized intrusion by an adversary.

The information that currently may be obtained includes artifacts that indicate the occurrence of an intrusion. An artifact is any item that has been used, created, deleted, or modified by an adversary or is representative of malware. These artifacts include, for example, file names, language settings, compilation paths, Internet protocol (IP) addresses, and other indicators that show an intrusion has occurred. Identifying artifacts is useful but often does not provide sufficient information to mitigate an ongoing attack or a future attack on a computer network. Thus, computer networks are not as secure against attacks from threat factors as desired even with the expenditure of significant amounts of money and effort.

Therefore, it would be desirable to have a method and apparatus that take into account at least some of the issues discussed above, as well as other possible issues. For example, it would be desirable to have a method and apparatus that overcome the technical problem with obtaining information about an adversary to mitigate a current attack or prevent a future attack on a computer network.

SUMMARY

An embodiment of the present disclosure provides a method for managing an attack on a computer system. A computer identifies actions taken by an adversary in the computer system and links connecting the actions over time using an ontology defining linking rules for linking the actions over time. The computer creates a graph of the actions with the links connecting the actions over time. The graph shows a number of patterns of behavior for the adversary. The computer then identifies a protective action to take with respect to the computer system using the graph of the actions taken by the adversary.

Another embodiment of the present disclosure provides an apparatus comprising a threat manager. The threat manager identifies actions taken by an adversary in a computer system; identifies links connecting the actions over time using an ontology defining linking rules for linking the actions; and creates a graph of the actions with the links connecting the actions over time. The graph shows a number of patterns of behavior for the adversary. The threat manager also identifies a protective action to take with respect to the computer system using the graph of the actions taken by the adversary.

Yet another embodiment of the present disclosure provides a computer program product for managing an attack on a computer system. The computer program product comprises a computer readable storage media, and first program code, second program code, third program code, and fourth program code stored on the computer readable storage media. The first program code identifies actions taken by an adversary in the computer system. The second program code identifies links connecting the actions over time using an ontology defining linking rules for linking the actions. The third program code creates a graph of the actions with the links connecting the actions over time. The graph shows a number of patterns of behavior for the adversary. The fourth program code identifies a protective action to take with respect to the computer system using the graph of the actions taken by the adversary.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 24 is an illustration of a table of backlink percent nodes in accordance with an illustrative embodiment;

FIG. 25 is an illustration of a table of sub-linkographs having nodes with a Shannon entropy of 1 in accordance with an illustrative embodiment.

DETAILED DESCRIPTION

The illustrative embodiments recognize and take into account one or more different considerations. For example, the illustrative embodiments recognize and take into account that obtaining other information in addition to or in place of artifacts may help prevent or mitigate cyber-attacks by adversaries. The illustrative embodiments recognize and take into account that characterizing the behavior of an adversary that occurred during an attack on a computer may be useful to anticipate future behavior by an adversary.

The illustrative embodiments recognize and take into account that identifying the patterns of behavior of adversaries performing attacks is useful. For example, this information may be used to reduce damage in current attacks, future attacks, or in both current attacks and future attacks.

Additionally, the illustrative embodiments also recognize and take into account that knowing the behavior of an adversary may also be used to take protective actions during an attack in a manner that reduces or prevents damage caused by an attack. For example, the illustrative embodiments recognize and take into account that when one or more patterns of behavior of an adversary can be identified, protective actions may be taken in the computer system to influence the behavior of the adversary in a manner that reduces or prevents damage that the adversary may cause within a computer or computer networks.

Thus, the illustrative embodiments provide a method and apparatus for managing an attack on a computer system. The process begins by identifying actions taken by an adversary in the computer system. The process identifies links between the actions using an ontology defining linking rules for linking the actions over time. The process creates a graph of the actions with the links between the actions.

The graph shows a number of patterns of behavior for the adversary. The graph indicates the interaction between actions that have been taken by the adversary and events that occur in the computer system. As depicted, the graph may be used by a user in the form of software. In another list of examples, the graph may be used by a human user who may view the graph on a display system.

As used herein, "a number of," when used with reference to items, means one or more items. For example, "a number of patterns of behavior" is one or more patterns of behavior.

The process identifies a protective action to take with respect to the computer system using the graph of the actions taken by the adversary. In this manner, a quantitative analysis of the adversary and the attack patterns may be made.

Figure 1:
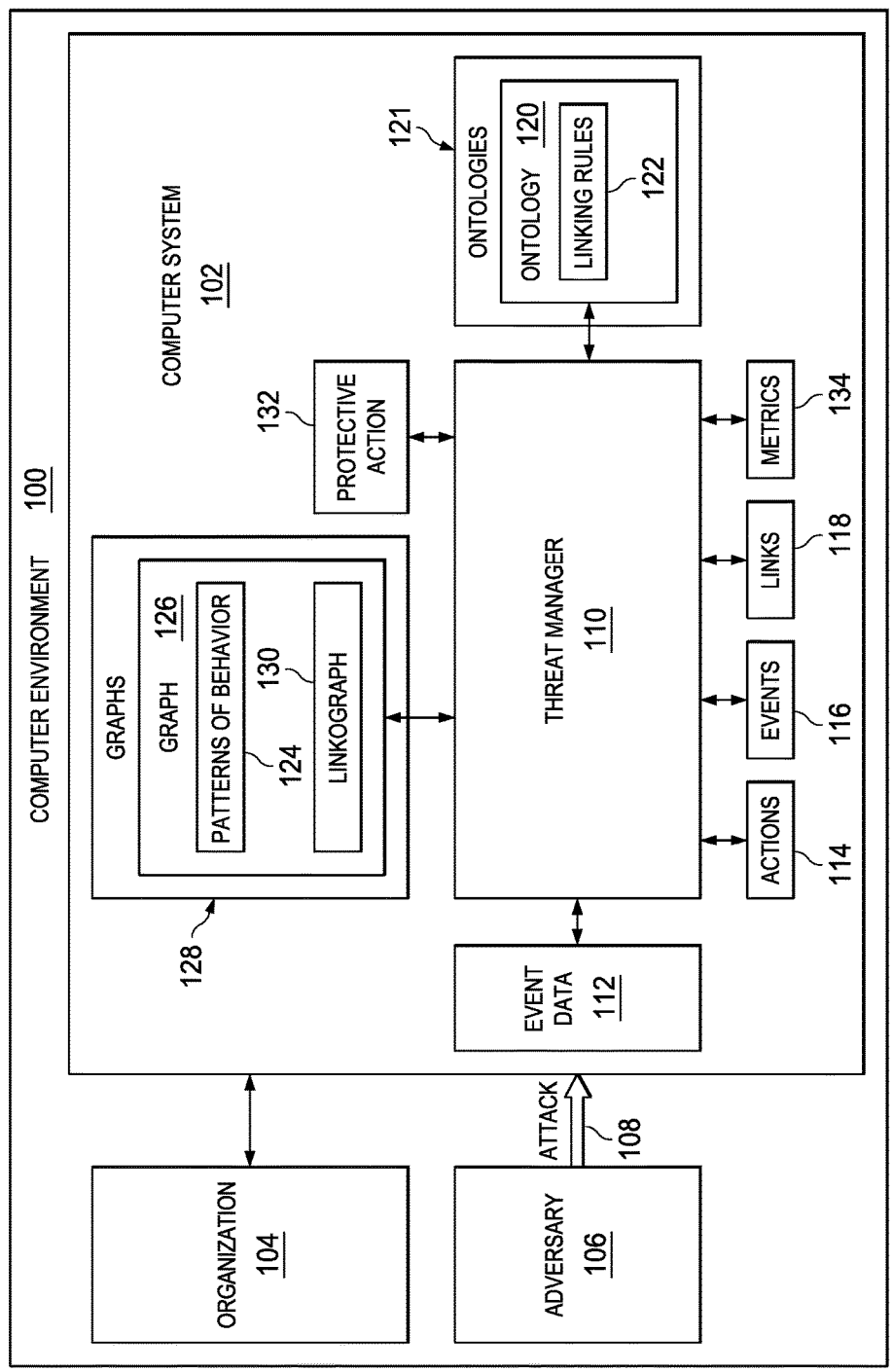
FIG. 1 is an illustration of a block diagram of a computer environment in accordance with an illustrative embodiment.

With reference now to the figures, and in particular, with reference to FIG. 1, an illustration of a block diagram of a computer environment is depicted in accordance with an illustrative embodiment. As depicted, computer environment 100 includes computer system 102.

In the illustrative example, computer system 102 is a hardware system that includes one or more data processing systems. In other words, computer system 102 may be a single computer or may be multiple computers that are in communication with each other using a network.

When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system. When computer system 102 is a network of computers, the network may be selected from at least one of a local area network (LAN), a wide area network (WAN), an intranet, or some other type of network.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, computer system 102 is used by organization 104 to perform operations. These operations may include research, sales, marketing, customer service, payroll, logistics, and other suitable types of operations.

As depicted, adversary 106 may access computer system 102 to perform attack 108 on computer system 102. In this illustrative example, adversary 106 is a person, program, computer, or other entity that accesses computer system 102 without authorization.

Attack 108 may be a cyber-attack. A cyber-attack is an action taken against computer system 102 by adversary 106 that may steal information, alter information, delete information, use a computer without authorization, disrupt processing of tasks by computer system 102, hijack computer system 102 to perform other tasks, damage a data processing system in computer system 102, or other unauthorized actions. When computer system 102 includes more than one data processing system, attack 108 may be performed on one or more of the computers in computer system 102.

In the illustrative example, threat manager 110 manages attack 108 by adversary 106. The managing of attack 108 may include at least one of obtaining information, reducing damage, preventing damage, or other suitable actions with respect to attack 108.

As depicted, threat manager 110 may be implemented in software, hardware, firmware or a combination thereof. When software is used, the operations performed by threat manager 110 may be implemented in program code configured to run on hardware, such as a processor unit. When firmware is used, the operations performed by threat manager 110 may be implemented in program code and data and stored in persistent memory to run on a processor unit. When hardware is employed, the hardware may include circuits that operate to perform the operations in threat manager 110.

In the illustrative example, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices.

Additionally, the processes may be implemented in organic components integrated with inorganic components and may be comprised entirely of organic components excluding a human being. For example, the processes may be implemented as circuits in organic semiconductors.

Threat manager 110 may be a data processing system such as a computer or some other hardware device in computer system 102. As depicted, the management of attack 108 by threat manager 110 includes monitoring the attack to obtain event data 112 that is used to identify at least one of actions 114 or events 116. Event data 112 may be obtained through different mechanisms. For example, event data 112 may be obtained from network traffic in computer system 102.

As another example, event data 112 may be obtained from user input to computer system 102. As still another example, event data 112 may be obtained from commands executed by a program. In this example, the program may be a script or some other suitable type of program.

As depicted, actions 114 are taken by adversary 106. Actions 114 may be selected from at least one of a look, a move, a transfer, an execute, a cleanup, or some other action that adversary 106 may perform in computer system 102. Events 116 are ones that occur within computer system 102. For example, an event in events 116 may be attack 108.

During operation, threat manager 110 identifies actions 114 taken by adversary 106 in computer system 102. Further, in this example, threat manager 110 identifies links 118 connecting actions 114 using ontology 120 in ontologies 121. In this illustrative example, links 118 connect actions 114 over time. As depicted, actions 114 occur over time, and links 118 show the relationship of actions 114 to each other as actions 114 occur over time.

Ontology 120 defines linking rules 122 for linking actions 114. In the list of examples, ontology 120 may be selected to emphasize a number of patterns of behavior 124.

Threat manager 110 creates graph 126 in graphs 128. Graph 126 includes actions 114 with links 118 connecting actions 114. In the illustrative example, graph 126 shows a number of patterns of behavior 124 for the adversary.

As depicted, graph 126 is linkograph 130. Threat manager 110 may select another ontology in ontologies 121 to emphasize the second number of patterns of behavior 124 that may be different from the first number of patterns of behavior 124 using ontology 120. In this manner, different ones of ontologies 121 may be selected to see whether behaviors emphasized or highlighted by graphs 128 show that those patterns of behavior in patterns of behavior 124 are present in actions 114.

In the illustrative example, threat manager 110 identifies protective action 132 using graph 126 of actions 114 taken by adversary 106. Protective action 132 may be an action taken with respect to the computer system 102.

By analyzing graph 126, patterns of behavior 124 of adversary 106 may be identified. This information may lead to an identification of the motivation and intent of adversary 106. Additionally, patterns of behavior 124 may be used to understand how knowledgeable adversary 106 is as well as whether adversary 106 has attacked computer system 102 at a prior time. This type of understanding may be used to identify protective action 132.

The identification may be made using at least one of a policy, an artificial intelligence process, a knowledge base, or other mechanism in threat manager 110. In another illustrative example, a human user or other program may use graph 126 to identify protective action 132. For example, when a human user uses graph 126, graph 126 may be displayed in a graphical user interface in a display system in computer system 102.

In the illustrative example, protective action 132 may take different forms. For example, protective action 132 may be one selected from a group of protective actions comprising using a defensive tool, placing a honeytoken, placing a honeycue, or some other action that may be used to protect computer system 102. In this example, a honeycue is "some change" that is intended to influence the next action or actions taken by adversary 106. Protecting computer system 102 may include preventing damage, reducing damage, identifying adversary 106, slowing down attack 108, stopping attack 108, keeping adversary 106 from obtaining any additional access to computer system 102, or some other suitable action.

The different operations performed by threat manager 110 may occur in real time. For example, the operations may be performed during the time while adversary 106 is performing actions 114 in attack 108. In this manner, a current attack on computer system 102 may be managed to reduce or prevent damage from a current ongoing attack.

As depicted, identifying protective action 132 may include performing an analysis of linkograph 130 using metrics 134. Metrics 134 are standards that are used to analyze graphs 128. For example, metrics 134 may be used to analyze linkograph 130 to identify patterns of behavior 124 or analyze patterns of behavior 124 that have been identified.

Metrics 134 are a mechanism to mathematically analyze attack 108 as represented by actions 114 in linkograph 130. From this analysis, protective action 132 may be identified.

In other illustrative examples, one or more of the operations performed by threat manager 110 may occur after adversary 106 has completed taking actions 114. Thus, threat manager 110 may be part of a set of tools in a network protection system using graphs 128.

In one illustrative example, one or more technical solutions are present that overcome a technical problem with obtaining information about an adversary to mitigate a current attack or prevent future attacks on a computer network. As a result, one or more technical solutions provide a technical effect of improving security in computer system 102. The technical effect may include reducing or preventing damage from an adversary. The technical effect may also provide information that may be used to understand the behavior of adversaries.

Another technical effect that may occur from one or more of the technical solutions includes identifying information that may be useful in preventing or reducing damage from the current or future attacks by adversaries. For example, a technical effect may include identifying at least one of a measure of the sophistication of an adversary, a similarity to other known patterns of attack, a change in behavior from prior patterns of behavior of a known adversary, or other information that may be useful in managing or preventing attacks.

As a result, computer system 102 operates as a special purpose computer system in which threat manager 110 in computer system 102 enables improved management of attacks by adversaries. With threat manager 110, the damage caused by an adversary may be reduced or avoided. In particular, threat manager 110 transforms computer system 102 into a special purpose computer system as compared to currently available general computer systems that do not have threat manager 110.

In the illustrative examples, the same reference numeral may be used in more than one figure. This reuse of a reference numeral in different figures represents the same element in the different figures.

Figure 2:
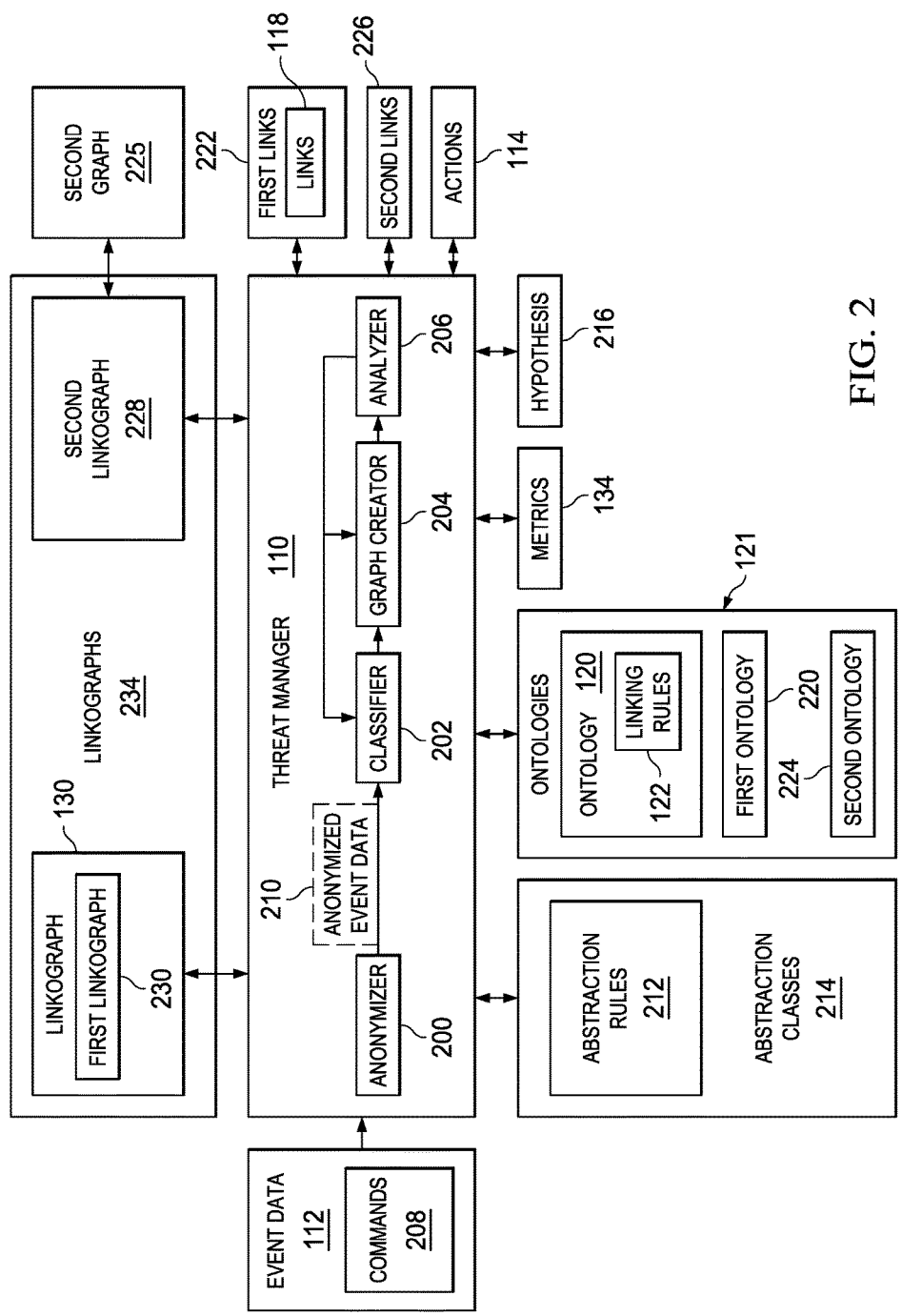
FIG. 2 is an illustration of a block diagram illustrating data flow in creating a linkograph in accordance with an illustrative embodiment.

With reference next to FIG. 2, an illustration of a block diagram illustrating data flow in creating a linkograph is depicted in accordance with an illustrative embodiment. An implementation of threat manager 110 is shown in this figure. As depicted, components in threat manager 110 include anonymizer 200, classifier 202, graph creator 204, and analyzer 206.

In this illustrative example, anonymizer 200 receives event data 112. Event data 112 may include information that is sensitive. In particular, commands 208 used by adversary 106 may include sensitive information such as passwords, filenames, Internet protocol (IP) addresses, password hashes, Social Security numbers, encryption keys, or other sensitive information.

Depending on who may have access to commands 208 or other portions of event data 112, anonymizer 200 in threat manager 110 may anonymize at least one of commands 208, parameters for commands 208, or other portions of event data 112 to form anonymized event data 210. In other words, portions of event data 112 may be modified or deleted to avoid viewing of sensitive information in anonymized event data 210. For example, the sensitive information may be replaced with pseudorandom values while the structure and semantics of the commands are preserved for analysis.

As depicted, event data 112 that has been anonymized by anonymizer 200 is sent to classifier 202. In the illustrative example, classifier 202 identifies actions 114 from anonymized event data 210 that has been anonymized by anonymizer 200.

In this example, classifier 202 in threat manager 110 identifies commands 208 from event data 112 in the form of anonymized event data 210. Classifier 202 applies a set of abstraction rules 212 to commands 208 identified in anonymized event data 210 to identify actions 114. As used herein, "a set of," when used with reference to items, means one or more items. For example, "a set of abstraction rules 212" is one or more of abstraction rules 212.

In this particular example, abstraction rules 212 are rules in abstraction classes 214 that are used to identify actions 114 from commands 208 in event data 112. For example, abstraction rules 212 may be applied to commands 208 to determine which of commands 208 corresponds to which one of abstraction classes 214 of actions 114 as defined by abstraction rules 212. Other types of abstraction classes 214 may be created and used depending on the type of event data 112 that is analyzed.

As depicted, a command in commands 208 may fall into more than one abstraction class in abstraction classes 214. In this illustrative example, actions 114 are selected from at least one of a look, a move, a transfer, an execute, a cleanup, or some other suitable action that may be identified using abstraction rules 212.

With the identification of which commands correspond to which actions 114 as defined by abstraction classes 214, graph creator 204 in threat manager 110 identifies links 118 connecting actions 114 using ontology 120. In this example, links 118 connect actions 114 over time. As depicted, ontology 120 is a definition for identifying links 118 connecting actions 114. The definition may include at least one of rules or models.

For example, ontology 120 defines how actions 114 in abstraction classes 214 relate and link to one another. The definition may be used as hypothesis 216 about a pattern of behavior in patterns of behavior 124 of adversary 106 during attack 108. For example, hypothesis 216 may be that adversary 106 has a pattern of behavior in which adversary 106 uses loops in actions 114 in computer system 102. Ontology 120 may be selected such that linkograph 130 shows the loops if actions 114 include loops.

In the illustrative example, ontology 120 may be first ontology 220 in ontologies 121, and links 118 may be first links 222. As depicted, threat manager 110 may use second ontology 224 in ontologies 121. Second ontology 224 may be received by a selection through user input made by a person, computer, or other device.

Graph creator 204 in threat manager 110 identifies second links 226 from actions 114 using second ontology 224. Graph creator 204 then creates second graph 225 of actions 114 with second links 226 connecting actions 114.

In this illustrative example, second graph 225 is second linkograph 228 and linkograph 130 is first linkograph 230 in linkographs 234. Second linkograph 228 may show a second number of patterns of behavior 124, which may be different from the number of patterns of behavior 124 shown in first linkograph 230.

Thus, different ones of ontologies 121 may be selected to determine whether particular patterns of behavior in patterns of behavior 124 are exhibited in attack 108 by adversary 106. In other words, each ontology in ontologies 121 may be directed towards one or more of patterns of behavior 124.

If those patterns of behavior are present, then linkograph 130 created using a particular ontology will show the presence of those patterns of behavior when analyzing commands 208 in event data 112 from attack 108. The presence of a pattern of behavior may be seen visually by at least one of a human user viewing linkograph 130 or analyzer 206 using metrics 134 to analyze linkograph 130.

Analyzer 206 in threat manager 110 may select which ones of ontologies 121 should be used in generating linkographs 234, and analyzer 206 may apply metrics 134 to linkographs 234. The application of metrics 134 to linkographs 234 provides results that may be used in analyzing attack 108.

For example, metrics 134 may be used to quantify which ones of commands 208 may be of interest for further analysis. Metrics 134 also may be used to determine whether a particular pattern of behavior is present in patterns of behavior 124. Further analysis may be made selecting additional ontologies in ontologies 121 to determine whether a particular one of patterns of behavior 124 is present in attack 108.

Further, analyzer 206 may identify protective action 132 based on the analysis of linkographs 234 using metrics 134. Analyzer 206 also may initiate protective action 132 or may send the identification of protective action 132 to a human user for review. In another example, analyzer 206 may send the identification of protective action 132 to an application, a computer, or some other data processing system in computer system 102 or in another computer system.

The illustration of computer environment 100 and the different components in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, threat manager 110 may be hardware or software running on a computer that is external to computer system 102. For example, computer system 102 may gather event data 112 used by threat manager 110 to analyze event data 112 after an attack. In another illustrative example, anonymizer 200 may be omitted or not used in threat manager 110.

In yet another illustrative example, graph 126 may take other forms other than linkograph 130. Any type of graph that may show links connecting actions to identify patterns of behavior 124 may be used. For example, graph 126 may also be a state diagram, a Markov chain with information relating the actions to each other over time, or some other suitable type of graph.

Figure 3:
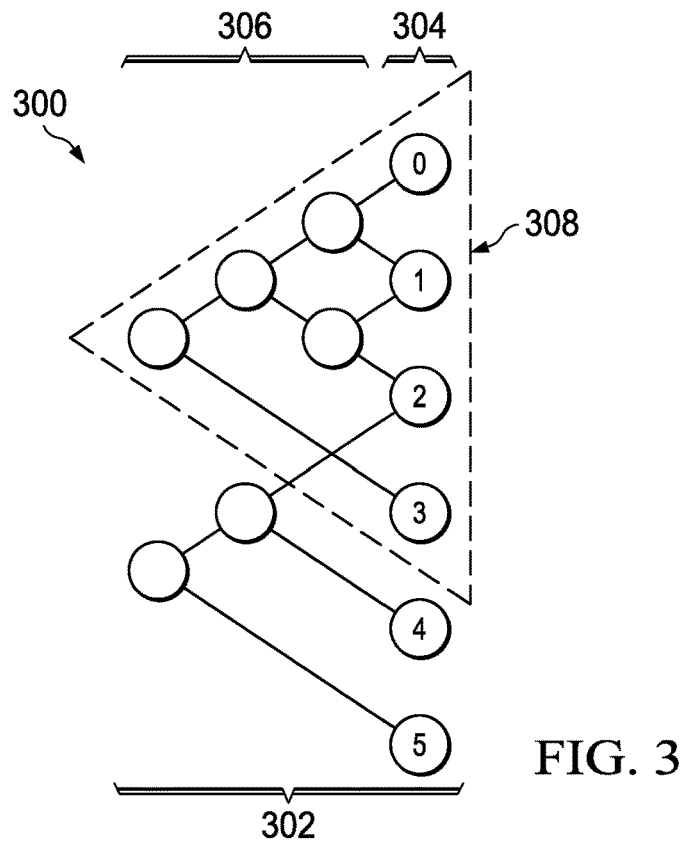
FIG. 3 is an illustration of a linkograph in accordance with an illustrative embodiment.

Turning next to FIG. 3, an illustration of a linkograph is depicted in accordance with an illustrative embodiment. In this illustrative example, linkograph 300 is an example of linkograph 130 shown in block form in FIG. 1 that is generated by threat manager 110.

As depicted, linkograph 300 is an undirected graph of nodes 302 that indicates the interactions between actions in an event such as attack 108. Linkograph 300 may be displayed to a human user for analysis or may be a data structure that is analyzed by a program or application, such as threat manager 110. As depicted, each action is represented as a leaf node. In linkograph 300, leaf nodes 304 are labeled with numbers. A leaf node is a node without child nodes.

Links are represented by link nodes 306. A link is formed by a pair of nodes in this illustrative example. The link may be a link node and a leaf node. As depicted in linkograph 300, each leaf node in leaf nodes 304 is identified as natural number index $n \in \mathbb{N}_{<n} = \{0, 1, \ldots, n-1\}$. Thus, leaf node 0 occurred before leaf node 1, and so forth. For example, the leaf nodes may show actions represented by the leaf nodes in the order in which the actions occur.

One or more link nodes are the links that connect a pair of leaf nodes (i,j) such that i<j and indicates a relationship between two leaf nodes i and j. Given link nodes (i,j), the node i is called a backlink of node j and j is a called a forelink of node i. A backlink can be thought of as a record of the path that led to the generation of an action represented by a node while a forelink bears evidence of a contribution to the production of further actions represented by nodes.

A linkograph, such as linkograph 300, is defined as follows:

Definition 1 (Linkograph). A linkograph on n nodes (where $n \in \mathbb{N}$) is a set of links, L, such that $$L \subset \{(i,j) | 0 \le i < j < n\} \qquad (1)$$

Linkograph 300 is described as follows:

$$L \subset \{(0,1),(0,2),(0,3),(1,2),(2,4),(2,5)\} \qquad (2)$$

As depicted, six of leaf nodes 304 are present in linkograph 300. Leaf nodes 304 are numerically labeled and represent the actions performed by an adversary. As depicted, link nodes 306 are not labeled and are the links that connect leaf nodes 304 to each other.

In addition to linkographs as a whole, sub-linkographs also may be analyzed. A sub-linkograph is denoted as SL(a,b). In this example, sub-linkograph SL(a,b) is the portion of linkograph 300 formed by only considering the links between nodes a through b. As depicted, "a" is the first node in the sub-linkograph and "b" is the last node in the sub-linkograph. The sub-linkograph also includes all of the nodes between "a" and "b". For example, the sub-linkograph SL(0,3) in section 308 for linkograph 300 in FIG. 3 is given by the following links:

$$SL(0,3) = \{(0,1),(0,2),(0,3),(1,2)\}. \qquad (3)$$

As illustrated, SL(0,3) are the nodes and links in section 308 of linkograph 300.

In an illustrative example, knowing the possible number of linkographs on a set of n nodes may be useful in deciding how to analyze an attack. For example, $M_n$ is the number of possible links on n nodes. The following theorem establishes the number of possible links:

Theorem 1 (Possible Links). Let L be a linkograph on n nodes, then the number of possible links is:

$$l_n := \frac{n(n-1)}{2} \quad (4)$$

Proof: When n=0 or 1, $$\frac{n(n-1)}{2}$$

is 0, which agrees with the set of possible links since the set $\{(i,j)|0 \leq i < j < n\}$ is empty in both cases.

When n>1, then the number of possible links is in bijective correspondence with the number of 2-subsets of $\mathbb{N}_{<n}$, that is, the set $$S_2 = \{\{i,j\} | i,j \in \mathbb{N}_{<n} \text{ and } i \neq j\} \quad (5)$$

has the same cardinality as $M_n$. Since the cardinality of $\mathbb{N}_{<n}$ is n, the cardinality of $S_2$ is $$\binom{n}{2} = \frac{n(n-1)}{2}, \quad (6)$$

where $$\binom{n}{m}$$

is the binomial coefficient n choose m.

Once the number of possible links is known, the number of possible linkographs may be identified as shown in the following theorem:

Theorem 2 (Cardinality of Distinct Linkographs). The number of distinct linkographs on n nodes is $2^{l_n}$.

Proof: Every linkograph, L, on n nodes is a subset of $M_n$, the set of possible links for n nodes. Thus, the number of distinct linkographs is the same as the cardinality of the powerset of $M_n$. Since the cardinality of $M_n$ is $l_n$ by Theorem 1, the cardinality of the powerset is $2^{l_n}$.

Figure 4:
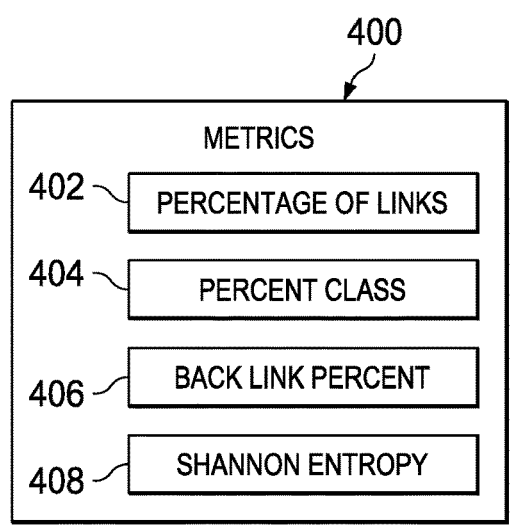
FIG. 4 is an illustration of example metrics that may be used to analyze linkographs in accordance an illustrative embodiment.

With reference now to FIG. 4, an illustration of example metrics that may be used to analyze linkographs is depicted in accordance an illustrative embodiment. In this illustrative example, metrics 400 are an example of an implementation for metrics 134 shown in block form in FIG. 1. Metrics 400 are used to quantitatively analyze linkographs.

As depicted, metrics 134 may be used to make comparisons between multiple linkographs. For example, metrics 134 may be used to analyze both first linkograph 230 and second linkograph 228 mathematically. In this manner, a more uniform and less subjective analysis of attacks may be made using metrics 134.

In this illustrative example, metrics 400 includes four metrics. Of course, other numbers of metrics 400 may be used in other examples. As depicted, metrics 400 includes Percentage Of Links 402, Percent Class 404, Back Link Percent 406, and Shannon Entropy 408.

Percentage Of Links 402 is expressed by the function PercentageOfLinks(lBound,uBound) and is the ratio of links present versus the total possible links for a sub-linkograph, SL(lBound,uBound). For example, for linkograph 300 in FIG. 3, PercentageOfLinks(0,3)=4/6 because there are six possible links for the sub-linkograph SL(0,3), but only four are present in this sub-linkograph in linkograph 300.

In the illustrative example, Percent Class 404 is expressed as PercentClass(abs_class) and is the ratio of nodes that belong to an abstraction class (abs_class) to the total leaf nodes in a linkograph. In other words, Percent Class 404 is a ratio of commands in event data 112 that belong to an action in an abstraction class to a subset of commands in event data 112.

In the illustrative example, Back Link Percent 406 is expressed as using the function BackLinkPercent(node). This function in this metric identifies the ratio of backlinks present for the given node versus the total possible backlinks in a linkograph.

For example, for node 3 in linkograph 300 in FIG. 3, BackLinkPercent(3)=1/3 since only one of the possible three backlinks is present.

As depicted, Shannon Entropy 408 is a metric that is expressed as ShannonEntropy(lBound,uBound). This metric is used to calculate the Shannon entropy for the sub-linkograph SL(lBound,uBound) as follows:

$$H := -p_{linked} \log_2(p_{linked}) - p_{unlinked} \log_2(p_{unlinked}) \quad (7)$$

where $p_{linked}$ is the ratio of links to the total number of possible links and $p_{unlinked}$ is the ratio of links not present to the total number of links. The value of ShannonEntropy(0,3) in linkograph 300 in FIG. 3 is calculated as follows:

$$-(4/6)\log_2(4/6) - (2/6)\log_2(2/6) \approx 0.92 \quad (8)$$

In the extreme cases when $p_{linked}=0$, $p_{linked}=1$, $p_{unlinked}=0$, or $p_{unlinked}=1$, the Shannon entropy is defined to be 0.

Although the Shannon entropy is defined in terms of two variables $p_{linked}$ and $p_{unlinked}$, and they are related by $p_{unlinked}=1-p_{linked}$. Thus, H can be written as $$H(p) := \begin{cases} 0 & \text{if } p = 0, 1 \\ -p\log_2(p) - (1-p)\log_2(1-p) & \text{otherwise} \end{cases} \quad (9)$$

where $p = p_{unlinked}$.

Many facts about Shannon entropy can be obtained by considering H as a function on [0,1] and not just as a function on the ratios of links, which only consists of a finite number of points. Accordingly, function $f_H: [0,1] \to \mathbb{R}$ is defined as follows:

$$f_H(x) = \begin{cases} 0 & \text{if } x = 0, 1 \\ -x\log_2(x) - (1-x)\log_2(1-x) & \text{otherwise} \end{cases} \quad (10)$$

The following theorem establishes some basic facts about $f_H$:

Theorem 3. Let $f_H: [0,1] \to \mathbb{R}$ be defined by $$f_H(x) = \begin{cases} 0 & \text{if } x = 0, 1 \\ -x\log_2(x) - (1-x)\log_2(1-x) & \text{otherwise} \end{cases} \quad (11)$$

Then $f_H$ is continuous and $$f_H([0,1]) := \{f_H(x) | x \in [0,1]\} = [0,1]. \quad (12)$$

Furthermore, $f_H$ is maximized when x=1/2 and is minimized when x=0 or 1.

Proof: Since x, (1−x), $\log_2(x)$, and $\log_2(1-x)$ are continuous on (0,1), $f_H(x)$ is continuous on (0,1). To establish continuity at 0, first note that by L'Hopital's rule:

$$\lim_{x\to 0+} x\log_2(x) = \lim_{x\to 0+} \frac{\log_2(x)}{1/x} \quad (13)$$
$$= \lim_{x\to 0+} \frac{1/(x\ln 2)}{-1/x^2}$$
$$= \lim_{x\to 0+} \frac{-x}{\ln 2} = 0.$$

Using basic limit laws and the continuity of $(1-x)\log_2(1-x)$, the following is obtained:

$$\lim_{x\to 0+} f_H(x) = -\lim_{x\to 0+} x\log_2(x) - \lim_{x\to 0+} (1-x)\log_2(1-x) \quad (14)$$
$$= 0 - 0 = 0.$$

Continuity at 1 is established in a similar manner.

Since $f_H$ is continuous on [0,1], the Extreme Value Theorem implies that $f_H$ is bounded. Moreover, since the functions x, (1−x), $\log_2(x)$ and $\log_2(1-x)$ are all differentiable on (0,1), the extreme values occur at 0, 1, or when $f'_H(x)=0$.

Since the derivative of $f_H(x)$ is $$f'_H(x) = \log_2\left(\frac{1}{x} - 1\right), \quad (15)$$

$f'_H(x)$ is 0 if and only if x=1/2. So, the maximum value is 1 and the minimum value is 0, since $f_H(0)=f_H(1)=0$ and $f_H(1/2)=1$. The Intermediate Value Theorem establishes the second assertion.

The fact that $f_H(x)$ is continuous at 0 and 1 provides a justification for defining the Shannon entropy, H, to be 0 when $p_{linked}=0$ or 1. Indeed, if $$p_n^l = \frac{l}{n}$$

where l is the number of links and n is the total number of links, then, for a fixed l, $\lim_{n\to\infty} p_n^l = 0$. Thus, linkographs exist where p is arbitrarily close to 0. As a result, it is natural to define H(0) to be the limit $\lim_{x\to 0+} H(0)$, which exists and is 0 by Theorem 3.

The theory matches the intuition where: the Shannon entropy is lowest when the linkograph has either no links or all potential links. The highest Shannon entropy is found in linkographs where half of all potential links have been made.

Figure 5:
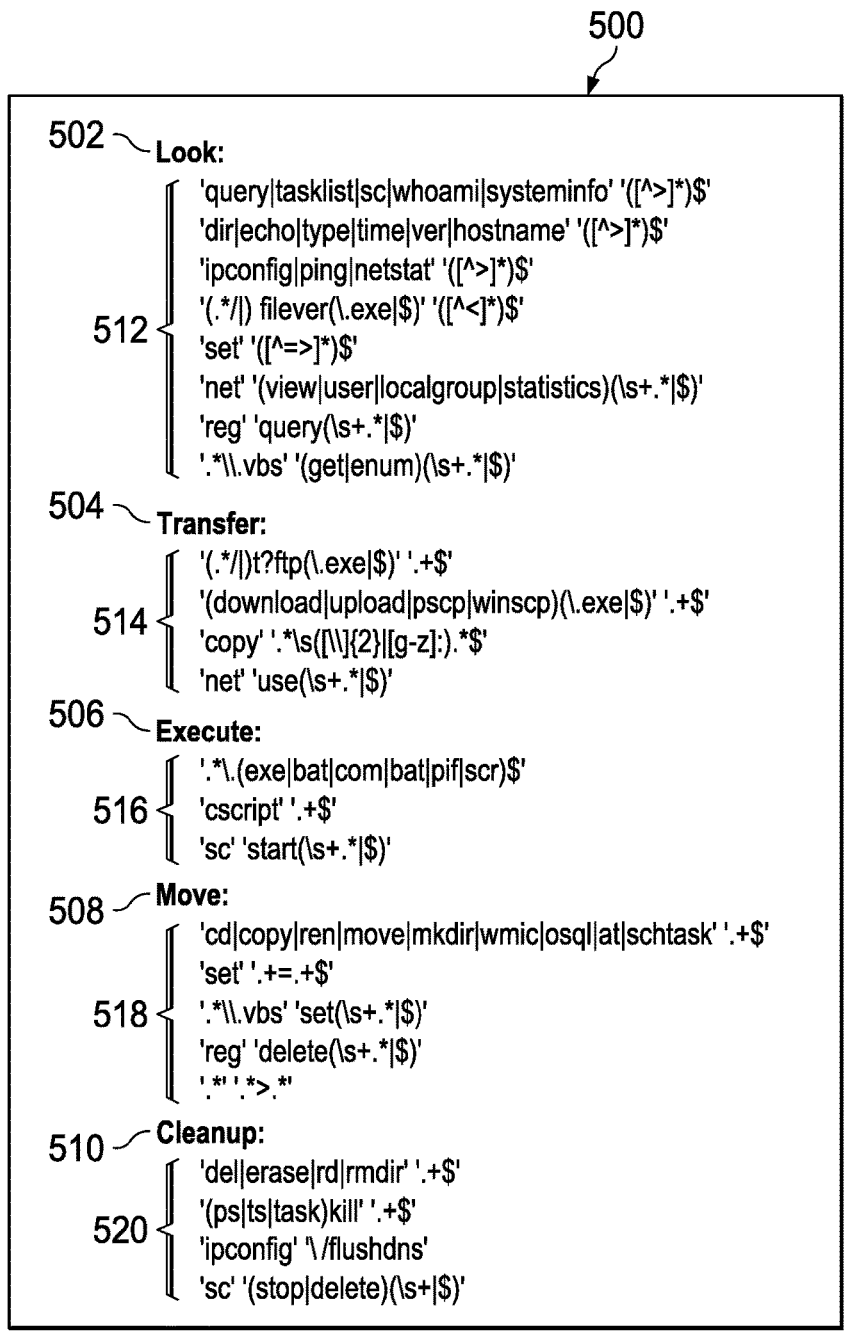
FIG. 5 is an illustration of a set of abstraction classes in accordance with an illustrative embodiment.

With reference next to FIG. 5, an illustration of a set of abstraction classes is depicted in accordance with an illustrative embodiment. Abstraction classes 500 are an example of abstraction classes 214 shown in block form in FIG. 2. In this illustrative example, abstraction classes 500 include classes for actions in the form of look 502, transfer 504, execute 506, move 508, and cleanup 510.

Each abstraction class defines which commands can be classified into which abstraction classes. In the illustrative example, the abstraction classes are categories of commands that can be classified as particular actions. Thus, commands can be classified into abstraction classes that correspond to actions.

For example, look 502 includes commands 512; transfer 504 includes commands 514; execute 506 includes commands 516; move 508 includes commands 518; and cleanup 510 includes commands 520. These classifications are examples of abstraction rules 212 used to identify actions 114 from commands 208.

In this particular example, the classes are defined using Microsoft Windows shell commands. Other illustrative examples may use other types of commands in addition to or in place of the ones depicted in other illustrative examples.

Figure 6:
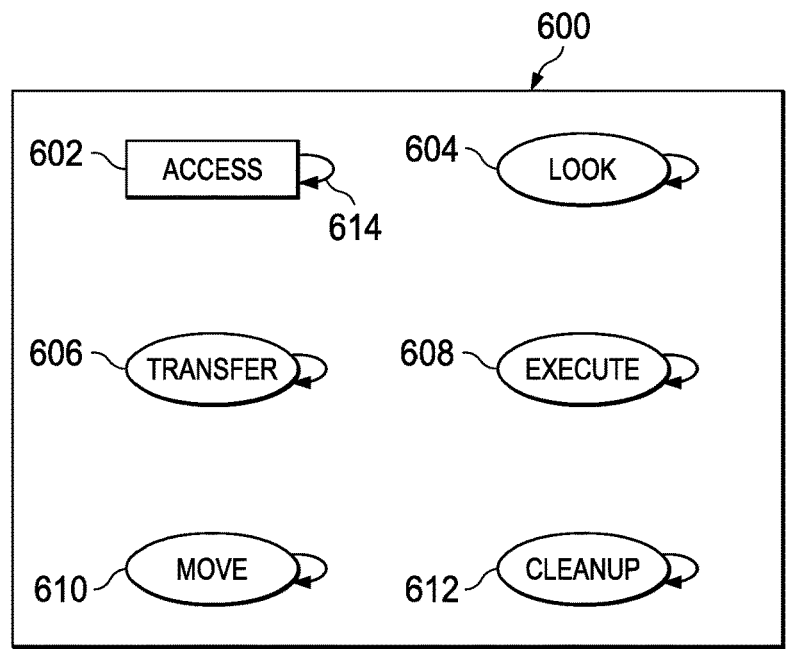
FIG. 6 is an illustration of an ontology in accordance with an illustrative embodiment.

Turning next to FIG. 6, an illustration of an ontology is depicted in accordance with an illustrative embodiment. Ontology 600 is an example of one implementation for first ontology 220 shown in block form in FIG. 2.

As depicted, ontology 600 shows self-loops. Ontology 600 is used create a linkograph that emphasizes a pattern of behavior by an adversary that includes self-loops. This ontology shows the behavior of how long an adversary performs a particular action. For example, actions such as access 602, look 604, transfer 606, execute 608, move 610, and cleanup 612 with self-loops are in ontology 600. The self-loops in ontology 600 indicate that repeated actions in ontology 600 should be linked.

As depicted, the self-loop for access 602 is indicated by arrow 614. In this illustrative example, arrow 614 for access 602 indicates that access 602 includes a first access followed by second access. As depicted, arrow 614 indicates that access 602 should be linked with every subsequent access.

Figure 7:
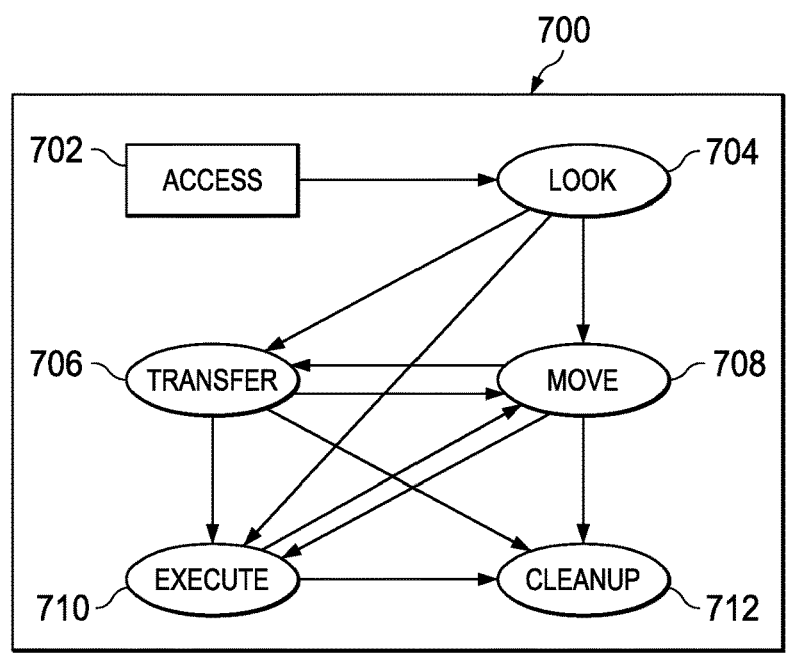
FIG. 7 is an illustration of a second ontology in accordance with an illustrative embodiment.

With reference to FIG. 7, an illustration of a second ontology is depicted in accordance with an illustrative embodiment. In this figure, ontology 700 is an example of an implementation for second ontology 224 shown in block form in FIG. 2. As depicted, ontology 700 is selected to create a linkograph that shows when actions in a pattern of behavior have forward progress.

Second ontology 224 is used to create a linkograph that emphasizes the presence of a pattern of behavior where the actions of an adversary show forward progress. The actions in ontology 700 include access 702, look 704, transfer 706, move 708, execute 710, and cleanup 712.

Ontology 700 shows forward progress for a sequence of actions. For example, forward progress is present when look 704 is followed by move 708, transfer 706, or execute 710. Additionally, actions like move 708, transfer 706, or execute 710 also indicate forward progress. Sequences of similar actions such as two moves in a row are not considered forward progress in ontology 700.

In this manner, the presence or absence of different patterns of behaviors may be shown in linkographs through a selection of at least one of abstract classes of behaviors or ontologies such as those illustrated in FIGS. 5-7. An analysis of linkographs created through these selections may be used to reveal a number of patterns of behavior of at least one of an attack or an adversary.

Figure 8:
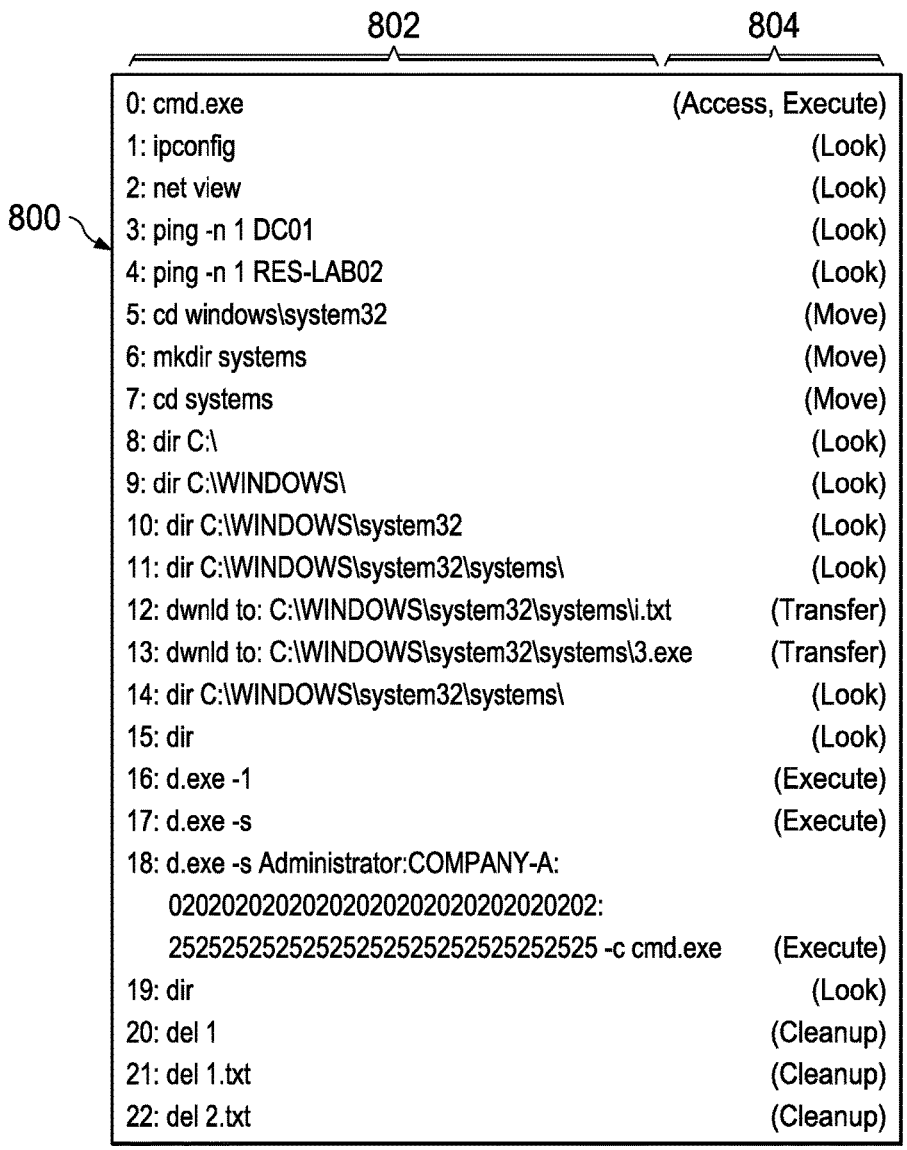
FIG. 8 is an illustration of commands classified into abstraction classes of actions in accordance with an illustrative embodiment.

With reference next to FIG. 8, an illustration of commands classified into abstraction classes of actions is depicted in accordance with an illustrative embodiment. In this illustrative example, list 800 is a list of commands used during an attack by an adversary. As depicted, commands 802 are shown in chronological order. In other words, commands 802 are shown in the order commands 802 occurred during an attack.

In this illustrative example, commands 802 have been processed to identify abstraction classes for actions 804. Actions 804 are labels for abstraction classes 500 in FIG. 5.

Figure 9:
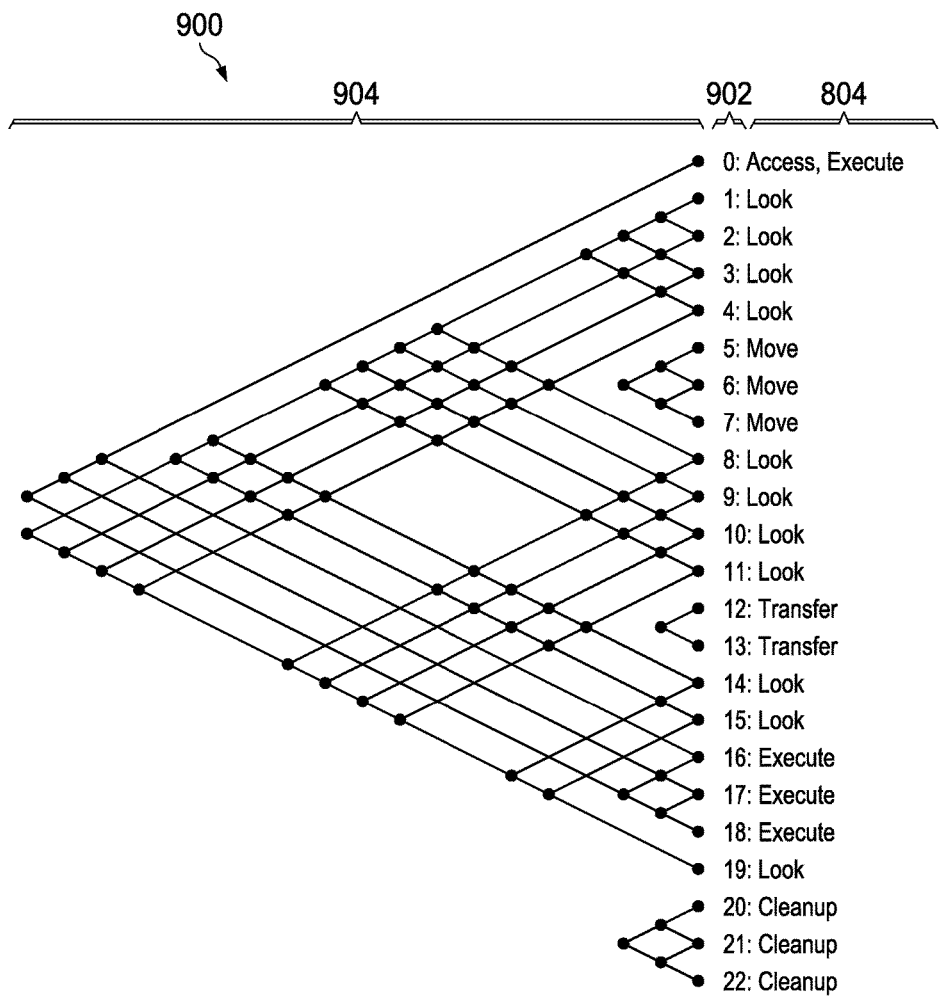
FIG. 9 is an illustration of a linkograph in accordance with an illustrative embodiment.

With reference now to FIG. 9, an illustration of a linkograph is depicted in accordance with an illustrative embodiment. In this illustrative example, linkograph 900 is created using actions 804 in FIG. 8. As depicted, actions 804 are shown as labels for leaf nodes 902 and linkograph 900. Link nodes 904 indicate the relationships between leaf nodes.

As depicted, the links between leaf nodes 902 made by link nodes 904 are based on the selection of an ontology. In this illustrative example, the ontology is first ontology 220 as depicted in FIG. 6.

Figure 10:
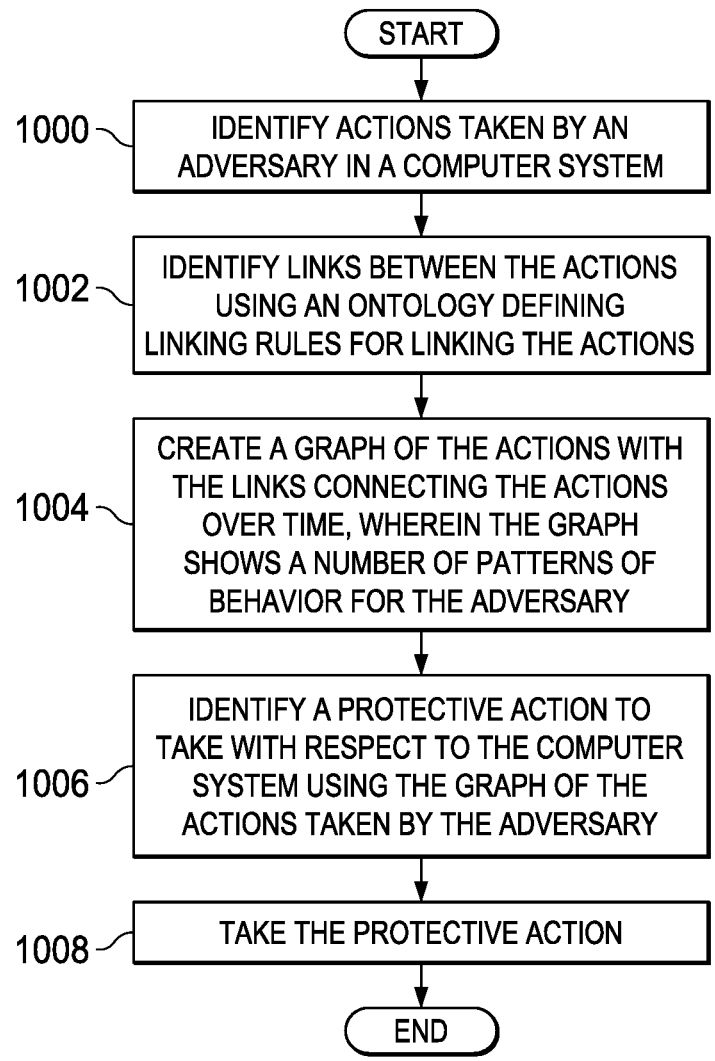
FIG. 10 is an illustration of a high level flowchart of a process for managing an attack on a computer system in accordance with an illustrative embodiment.

Turning next to FIG. 10, an illustration of a high-level flowchart of a process for managing an attack on a computer system is depicted in accordance with an illustrative embodiment. The process illustrated in FIG. 10 may be implemented in computer environment 100 in FIG. 1. For example, the process may be implemented in threat manager 110 in a computer in computer system 102 in FIG. 1. In other illustrative examples, the computer may be located in another computer system that is external to computer system 102.

The process begins by identifying actions taken by an adversary in a computer system (step 1000). The process identifies links between the actions using an ontology defining linking rules for linking the actions (step 1002).

The process creates a graph of the actions with the links connecting the actions over time, wherein the graph shows a number of patterns of behavior for the adversary (step 1004). The process identifies a protective action to take with respect to the computer system using the graph of the actions taken by the adversary (step 1006) and takes the protective action (step 1008) with the process terminating thereafter. In other words, the process may perform the protective action identified with respect to the computer system. Also, taking the protective action may include sending a message to a human user, a computer, or other entity with a suggested course of action to perform.

In some illustrative examples, the process in FIG. 10 may not terminate. The process may remain resident before, during, and after an attack.

Figure 11:
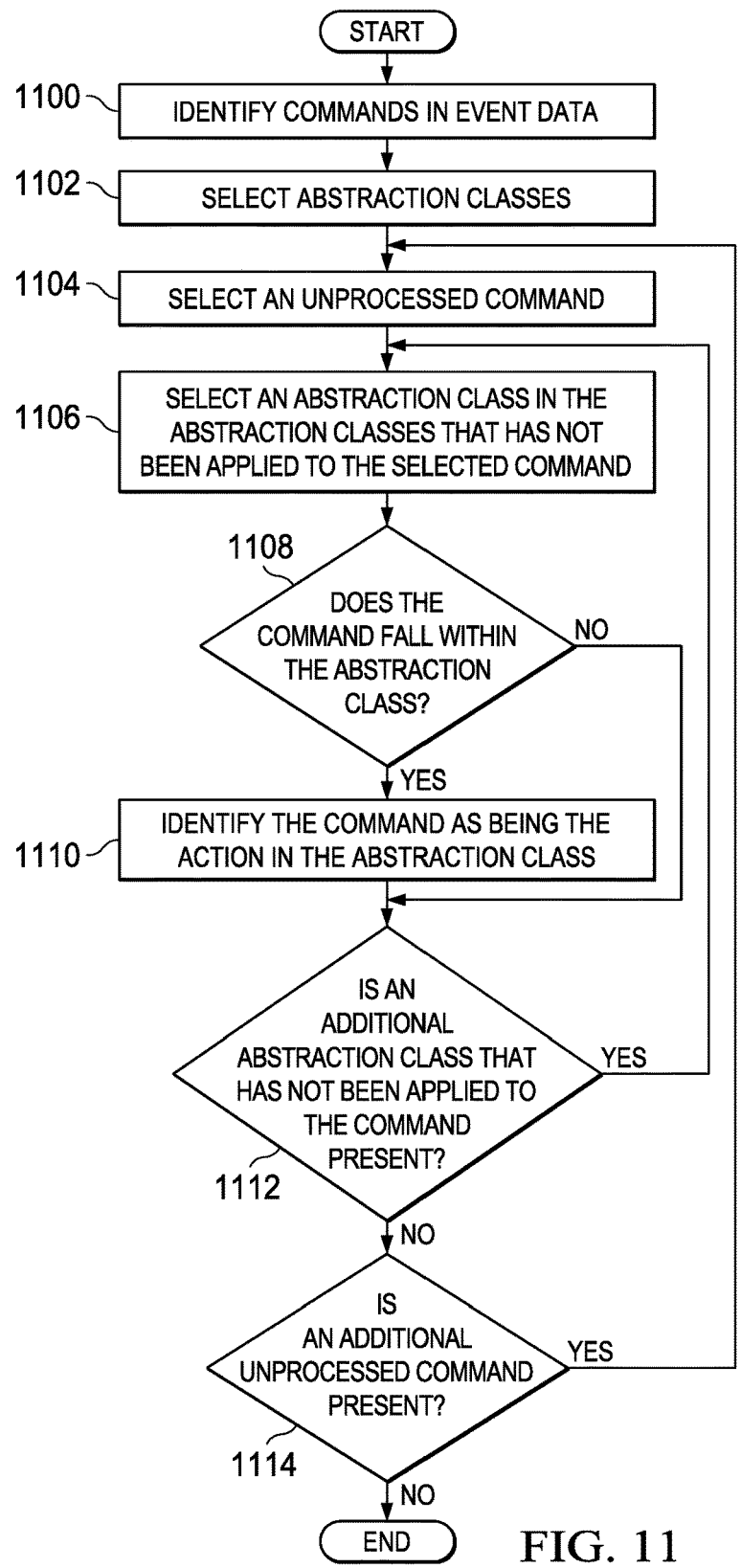
FIG. 11 is an illustration of a flowchart of a process for identifying actions from event data in accordance with an illustrative embodiment.

Turning next to FIG. 11, an illustration of a flowchart of a process for identifying actions from event data is depicted in accordance with an illustrative embodiment. The process illustrated in FIG. 11 may be implemented in classifier 202 in threat manager 110 in FIG. 2. The process in this flowchart may be an example of how step 1000 in FIG. 10 may be implemented.

The process begins by identifying commands in event data (step 1100). The process then selects abstraction classes (step 1102). The abstract classes are selected for use in classifying the commands into actions, in this example.

The process selects an unprocessed command (step 1104). As depicted, the commands are those originated by an adversary and are in a chronological order. The selection of the unprocessed command in step 1104 is performed by selecting the first unprocessed command based on the chronological order.

The process selects an abstraction class in the abstraction classes that has not been applied to the selected command (step 1106). A determination is made as to whether the command falls within the abstraction class (step 1108). If the command falls within the abstraction class, the process then identifies the command as being the action in the abstraction class (step 1110).

A determination is made as to whether an additional abstraction class is present that has not been applied to the command (step 1112). If an additional unapplied abstraction class is present, the process returns to step 1106. If all of the abstraction classes have been applied to the command, the process then determines whether an additional unprocessed command is present (step 1114).

If an addition unprocessed command is present, the process returns to step 1104. Otherwise, the process terminates. With reference again to step 1108, if the command does not fall within the abstraction class, the process proceeds to step 1112 as described above.

In FIG. 11, a command may be classified as more than one action in the illustrative example. Further, a command may not fall within any of the abstraction classes. In this case, the command may be ignored or assigned as a default action.

Figure 12:
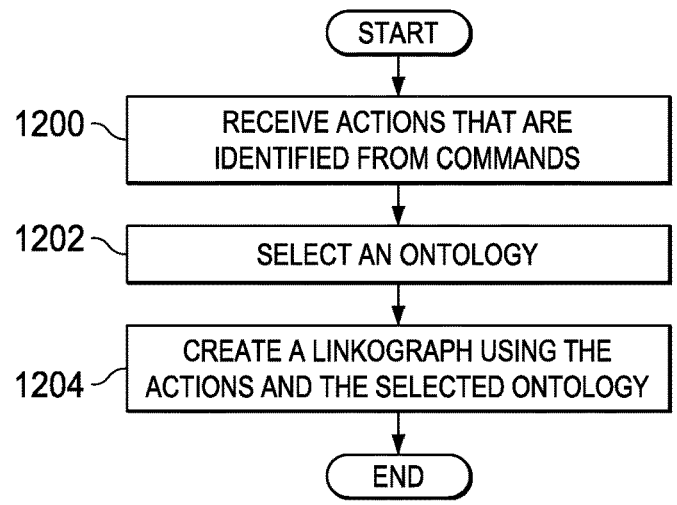
FIG. 12 is an illustration of a flowchart of a process for creating a linkograph in accordance with an illustrative embodiment.

With reference to FIG. 12, an illustration of a flowchart of a process for creating a linkograph is depicted in accordance with an illustrative embodiment. The process in FIG. 12 may be implemented in graph creator 204 in FIG. 2. The process in this flowchart may also be an example of an implementation of step 1004 in FIG. 10.

The process begins by receiving actions that are identified from commands (step 1200). The process then selects an ontology (step 1202). The selection of the ontology may be based on at least one of a default ontology, user input from a human user, user input from analyzer 206, or some other suitable source.

The process then creates the linkograph using the actions and the selected ontology (step 1204). The process terminates thereafter.

Figure 13:
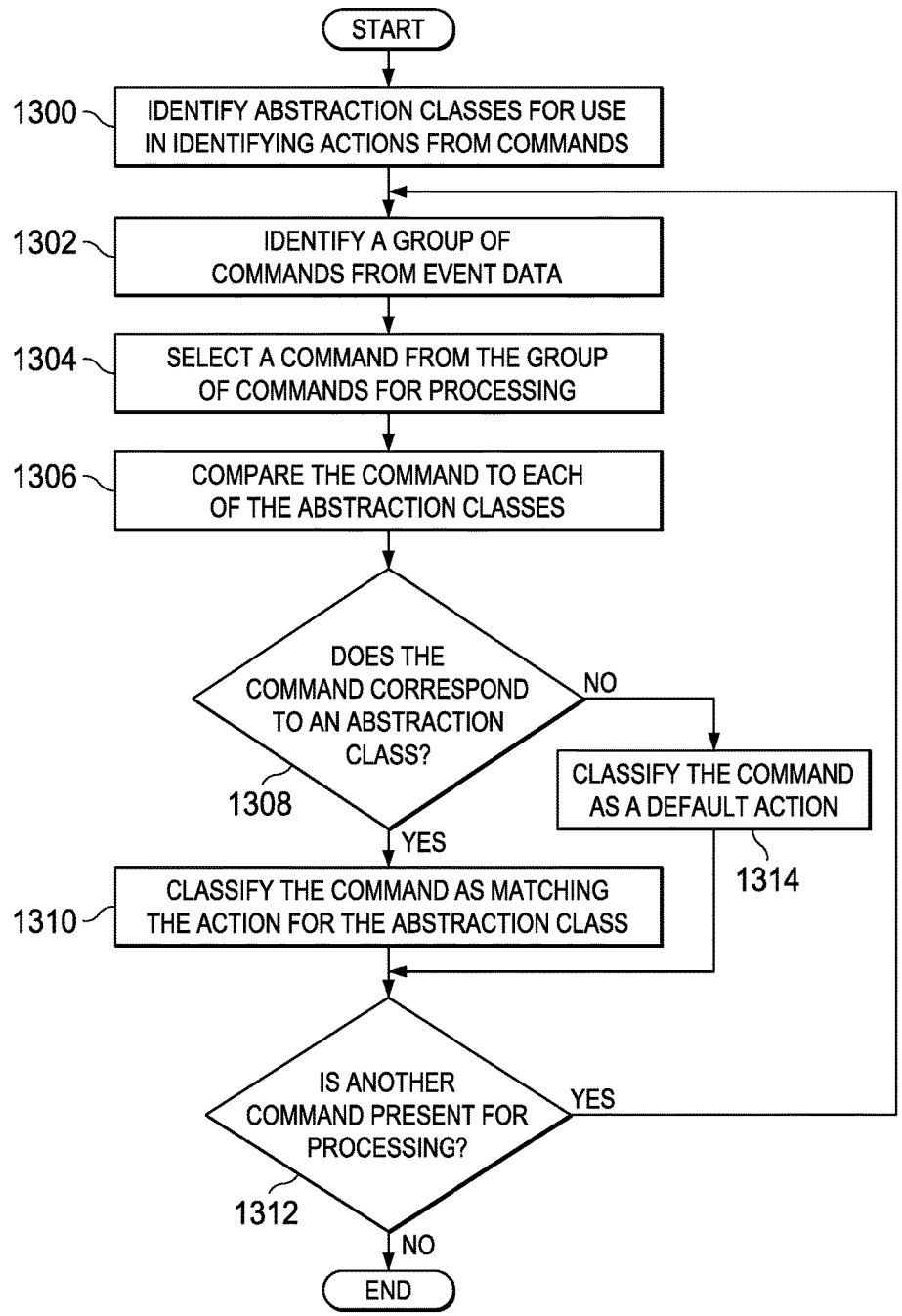
FIG. 13 is an illustration of a flowchart of a process for identifying classes from commands in accordance with an illustrative embodiment.

With reference next to FIG. 13, an illustration of a flowchart of a process for identifying classes from commands is depicted in accordance with an illustrative embodiment. The process illustrated in FIG. 13 may be implemented in classifier 202 in threat manager 110 to identify actions 114 from commands 208 in event data 112 using abstraction rules 212 in FIG. 2.

The process begins by identifying abstraction classes for use in identifying actions from commands (step 1300). The abstraction classes include abstraction rules that are used to classify commands into actions. In other words, a command is classified as an action using the abstraction classes.

The process identifies a group of commands from event data (step 1302). The process then selects a command from the group of commands for processing (step 1304). In this illustrative example, the selection may be made by going down a list in chronological order.

The process then compares the command to each of the abstraction classes (step 1306). A determination is made as to whether the command corresponds to an abstraction class (step 1308). If the command corresponds to an abstraction class, the command is classified as matching the action for the abstraction class (step 1310).

The process then determines whether another command is present for processing (step 1312). If another command is present, the process returns to step 1302. Otherwise, the process terminates.

With reference again to step 1308, if the command is not corresponding to an abstraction class, the process classifies the command as a default action (step 1314). The process then proceeds to step 1312 as described above.

Figure 14:
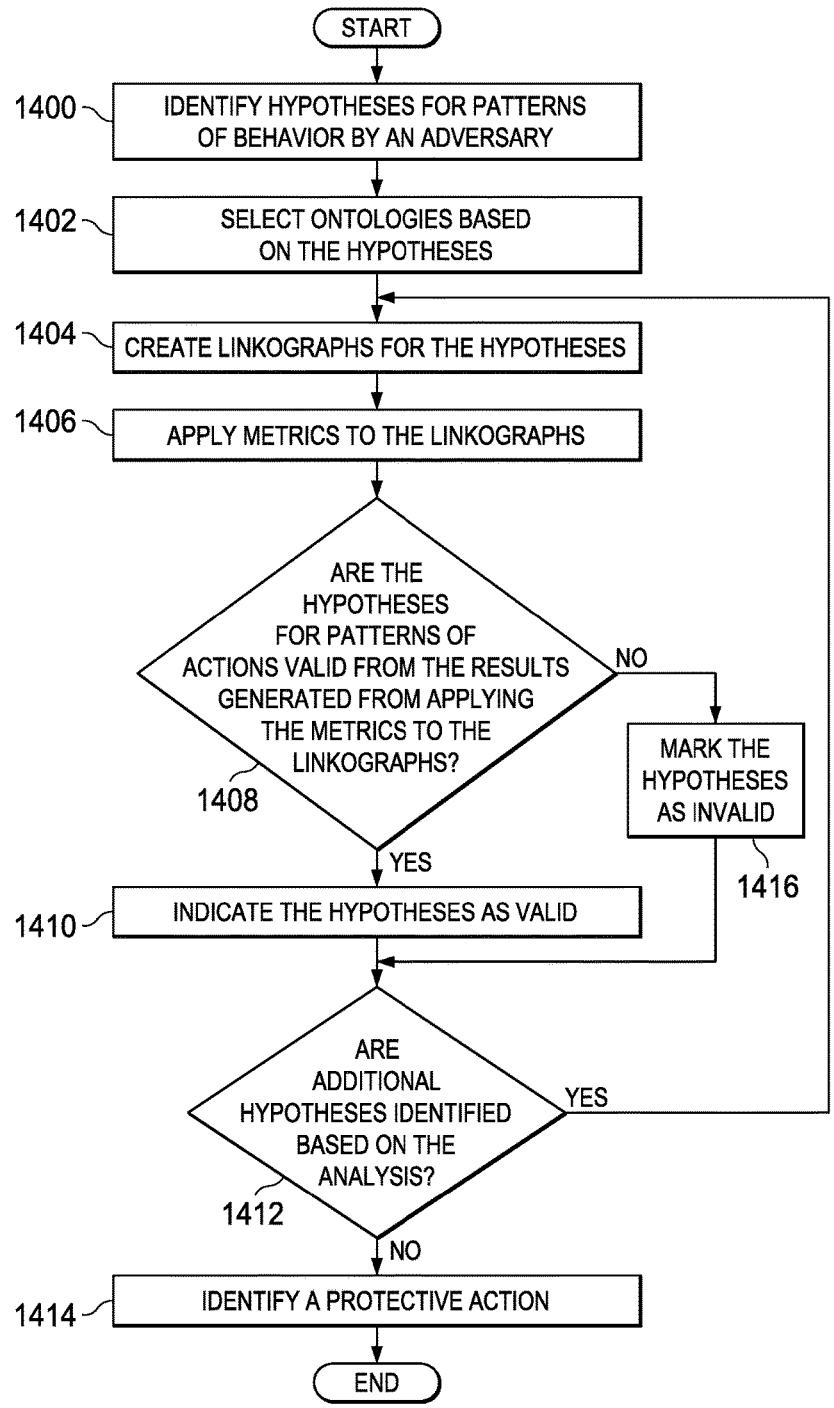
FIG. 14 is an illustration of a flowchart of a process for analyzing an attack using linkographs in accordance with an illustrative embodiment.

Turning to FIG. 14, an illustration of a flowchart of a process for analyzing an attack using linkographs is depicted in accordance with an illustrative embodiment. The process in FIG. 14 may be implemented in analyzer 206 in FIG. 2.

The process begins by identifying hypotheses for patterns of behavior by an adversary (step 1400). The process selects ontologies based on the hypotheses (step 1402). In step 1402, an ontology may be selected to generate a linkograph that will highlight a particular pattern of behavior that is hypothesized to be present if the particular pattern of behavior is actually present in the actions taken by the adversary.

The process creates linkographs for the hypotheses (step 1404). In this example, step 1404 may include sending the ontologies to graph creator 204 to obtain the linkographs.

The process applies metrics to the linkographs (step 1406). A determination is made as to whether the hypotheses for patterns of actions are valid from the results generated from applying the metrics to the linkographs (step 1408).

If the hypotheses are valid, the hypotheses are indicated as valid (step 1410). A determination is made as to whether additional hypotheses are identified based on the analysis (step 1412). If additional hypotheses are present, the process returns to step 1404. Otherwise, the process identifies a protective action (step 1414), with the process terminating thereafter.

With reference again to step 1408, if the hypotheses are not valid, the hypotheses are marked as invalid (step 1416). The process then proceeds to step 1412 as described above.

Figure 15:
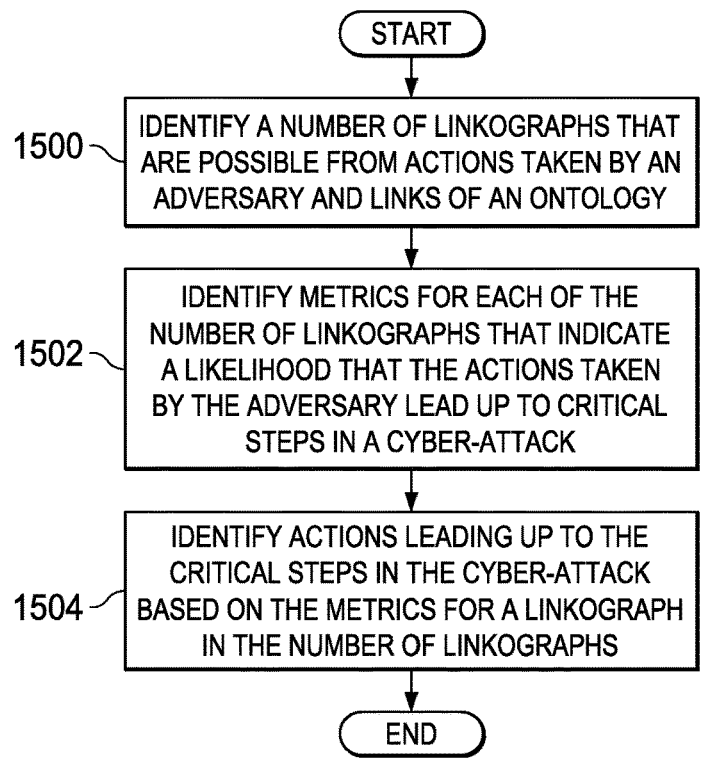
FIG. 15 is an illustration of a flowchart of a process for analyzing an attack using linkographs in accordance with an illustrative embodiment.

Turning next to FIG. 15, an illustration of a flowchart of a process for analyzing an attack using linkographs is depicted in accordance with an illustrative embodiment. The process in FIG. 15 may be implemented in analyzer 206 in FIG. 2. This process may be especially useful in identifying critical steps in an ongoing attack. These critical steps are ones that may cause undesired effects in a computer system. For example, the critical steps may include deleting data, transferring sensitive information, or other undesired steps.

The process begins by identifying a number of linkographs that are possible from actions taken by an adversary and links of an ontology (step 1500). The links in step 1500 are an example of links 118 in FIG. 1. The ontology is an example of ontology 120 in FIG. 1.

The process identifies metrics for each of the number of linkographs that indicate a likelihood that the actions taken by the adversary lead up to critical steps in a cyber-attack (step 1502). The metrics in step 1502 are an example of metrics 400 in FIG. 4.

The process then identifies actions leading up to the critical steps in the cyber-attack based on the metrics for a linkograph in the number of linkographs (step 1504) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 10 may be performed during an attack to manage the attack in real time as the attack occurs. The process may also be used after an attack to perform a post-attack analysis. In another example, the flowchart in FIG. 11 may include a step that anonymizes event data.

In yet another example, additional steps may be included in the flowchart in FIG. 15 to change the abstraction classes used to classify commands. For example, an abstraction class may be further divided into subclasses to better indicate whether a particular pattern of action is present when the actions are processed using an ontology to create links connecting the actions over time for a linkograph.

Figure 16:
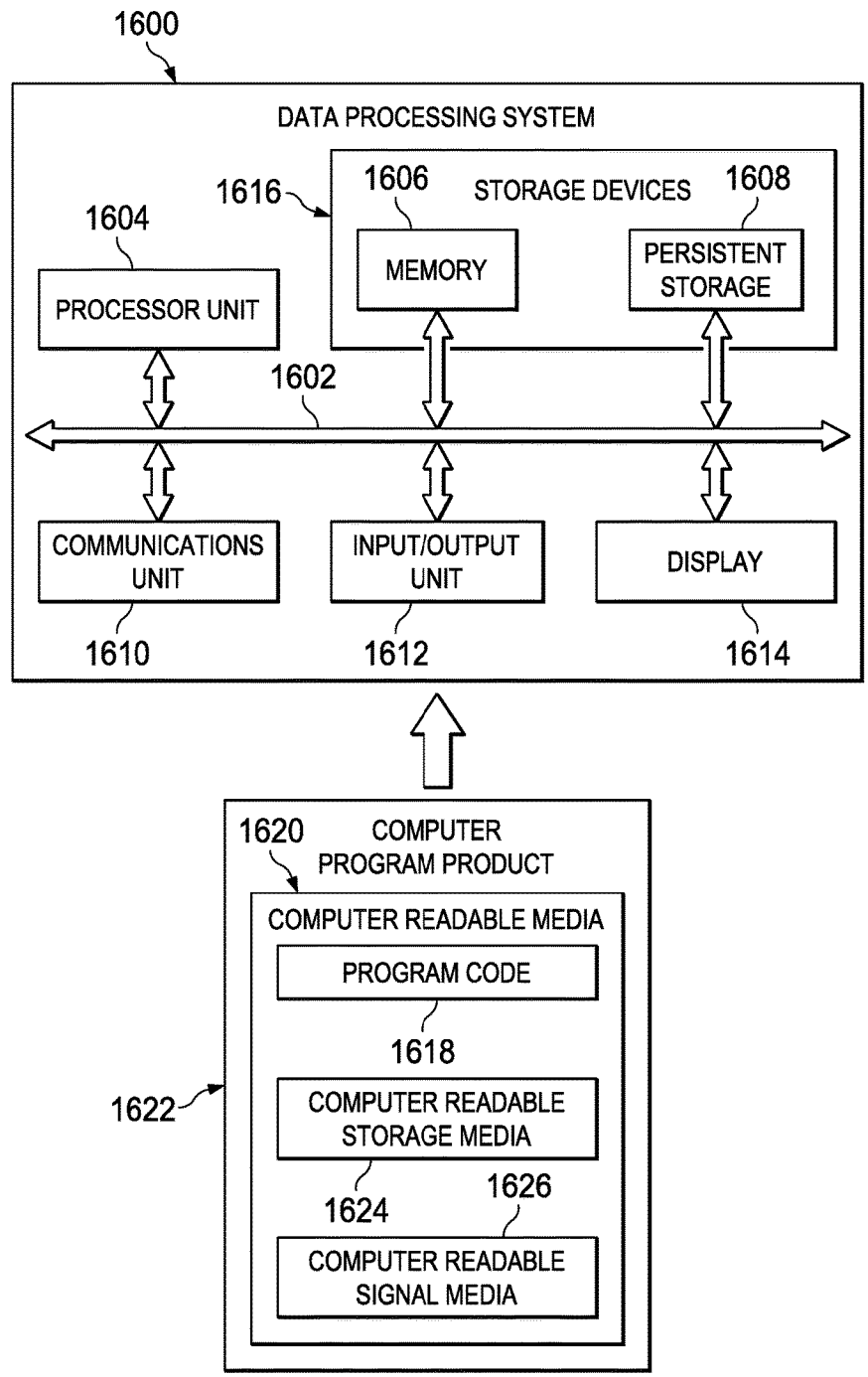
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 may be used to implement one or more data processing systems in computer system 102 in FIG. 1. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 may take the form of a bus system.

Processor unit 1604 serves to execute instructions for software that may be loaded into memory 1606. Processor unit 1604 may be a number of processors, a multi-processor core, or some other type of processor, depending on the particular implementation.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer readable storage devices in these illustrative examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that may be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these illustrative examples. In one example, computer readable media 1620 may be computer readable storage media 1624 or computer readable signal media 1626.

In these illustrative examples, computer readable storage media 1624 is a physical or tangible storage device used to store program code 1618 rather than a medium that propagates or transmits program code 1618.

Alternatively, program code 1618 may be transferred to data processing system 1600 using computer readable signal media 1626. Computer readable signal media 1626 may be, for example, a propagated data signal containing program code 1618. For example, computer readable signal media 1626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code 1618.

Example Analysis

In this section, an example analysis that may be performed in response to an attack on a computer system is described.

A. Linkograph Creation

In this illustrative example, the commands are anonymized to obtain commands 802 as shown in list 800 in FIG. 8. Commands 802 and abstraction classes 214 in FIG. 2 are sent to threat manager 110.

In response, threat manager 110 assigns abstraction class labels in the form of actions 804 to commands 802 in FIG. 8. In the illustrative example, commands 802 belong to at least one abstraction class, but may belong to more abstraction classes depending on the functionality of commands 802.

Once commands 802 are labeled using abstraction classes 500, an ontology is used to create a linkograph. In this depicted example, ontology 600 in FIG. 6 is used by threat manager 110 with actions 804 in FIG. 8 to create linkograph 900 in FIG. 9.

B. Linkograph Analysis

By using ontology 600 with self-loops to create linkograph 900, a graphical representation of the percentage of commands of a given abstraction class in a given area is depicted in linkograph 900. When displayed on a display system, a human user may view and analyze linkograph 900.

For example, the sub-linkograph SL(1,4) in section 906 is maximally linked, which directly corresponds to every command belonging to the same class. By following the maximally linked sub-linkographs, a visualization of sub-linkograph SL(1,4), sub-linkograph SL(5,7), sub-linkograph SL(8,11), sub-linkograph SL(12,13), sub-linkograph SL(14, 15), sub-linkograph SL(16,18), and sub-linkograph SL(20, 22) may be seen. These sub-linkographs correspond to the sequence of abstraction classes of actions: Look, Move, Look, Transfer, Look, Execute, and Cleanup as depicted for abstraction classes 500 in FIG. 5. This sequence is useful because the sequence shows how the adversary progresses through the computer system.

In addition to identifying this sequence of sub-linkographs visually, an algorithmic determination of such sequences may be made considering the percentage of linked nodes versus the total number of possible links for a given sublinkograph.

Using the metric Percentage Of Links 402 in FIG. 4, the sequence of actions in linkograph 900 can be recreated as the sequence of maximal sub-linkograph SL(a,b) such that the function PercentageOfLinks (a,b)=1.0. For example, sub-linkograph SL(1,4) is identified as PercentageOfLinks (1,4)=1.0 since all of the commands are of the abstraction class for the action Look 502 and are thus all linked. Being able to quickly find sets of similar commands and transitions between commands allows an analyst to better understand the steps performed in an attack. The analyst may be at least one of threat manager 110 or a human analyst.

Another useful metric for analyzing the linkograph 900 in FIG. 9 is Percent Class 404 in FIG. 4. This metric may be used to determine the percentage of time the adversary spends in performing a particular action.

Figure 17:
FIG. 17 is an illustration of a table of percent occurrences for abstraction classes in the form of actions in accordance with an illustrative embodiment.

Turning to FIG. 17, an illustration of a table of percent occurrences for abstraction classes in the form of actions is depicted in accordance with an illustrative embodiment. In this illustrative example, table 1700 shows abstraction classes for actions in column 1702 and an occurrence of the actions relative to other actions in commands 802 in list 800 in FIG. 8 as percentages in column 1704. As depicted, table 1700 shows a value of Percent Class 404 for each abstraction class in abstraction classes 500 in FIG. 5.

In table 1700, the most common action performed by the adversary is Look. The Look action accounts for almost half of all of commands 802 in list 800 in FIG. 8. The next most common action is Execute and is about 17 percent of commands 802. As depicted, a relatively low number of commands 802 for moving about in the system are shown.

The use of Percent Class 404 in metrics 400 in FIG. 4 indicates a large number of commands 802 in list 800 and deals with looking around and understanding the system environment. A further analysis of this behavior may be made. A minimal amount of movement was made by the adversary.

As a result, a hypothesis may be made that the adversary was not running "dir" commands with arguments, such as paths. This situation implies the majority of the looking around is due to remote commands such as "ping" and "net view". This hypothesis may be tested using threat manager 110. The hypothesis may be tested by updating the abstraction classes used by threat manager 110 to account for this behavior. For example, the abstraction class, Look 502 in FIG. 5, may be partitioned into two separate classes.

Figure 18:
FIG. 18 is an illustration of a partition of an abstraction class in accordance with analyst embodiment.

Turning to FIG. 18, an illustration of a partition of an abstraction class is depicted in accordance with an illustrative embodiment. Partition 1800 shows the abstraction class for Look 502 in FIG. 5 as being partitioned into LNet 1802 and LSystem 1804. As depicted, LNet 1802 is a Look action that looks at the net, and LSystem 1804 is a Look action that looks at the local file structure. All other abstraction classes in abstraction classes 500 in FIG. 5 are unmodified in this illustrative example.

Figure 19:
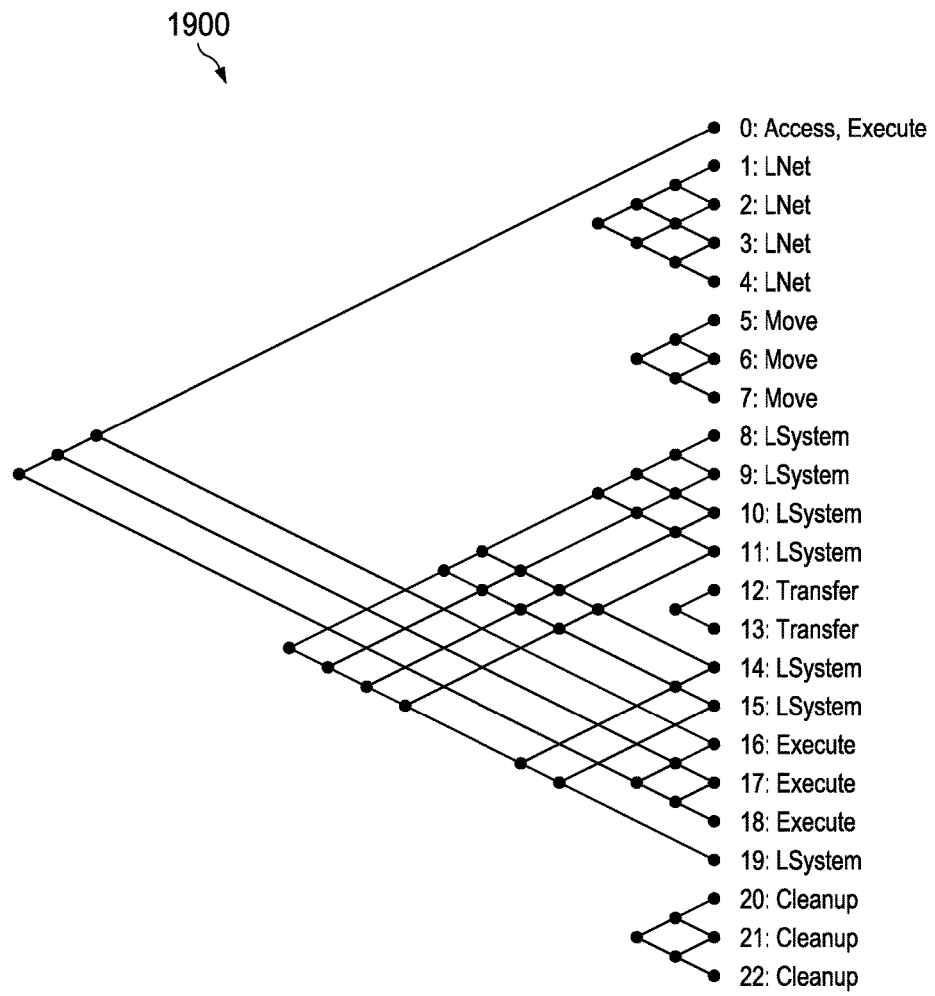
FIG. 19 is an illustration of a linkograph in accordance with an illustrative embodiment.

Turning now to FIG. 19, an illustration of a linkograph is depicted in accordance with an illustrative embodiment. Threat manager 110 uses the abstraction classes and the commands in list 800 to create linkograph 1900. From linkograph 1900, the metric, Percent Class 404, shows LSystem 1804 has 30.43 percent of the commands and LNet 1802 has 17.39 percent of the commands.

This result shows that the number of commands classified as LSystem 1804 is almost double of the commands classified as LNet 1802 commands. Thus, this result disproves the hypothesis.

A greater proportion of commands 802 in list 800 in FIG. 8 is dedicated to exploring the local file system in order to identify locations of interest as opposed to understanding the network. From linkograph 1900, only the first few initial Look commands in sub-linkograph SL(1,4) deal with understanding the network. Additionally, many of the "dir" commands shown in list 800 in FIG. 8 are called with arguments. These types of actions allowed the adversary to examine the local system while remaining in a single directory.

Figure 20:
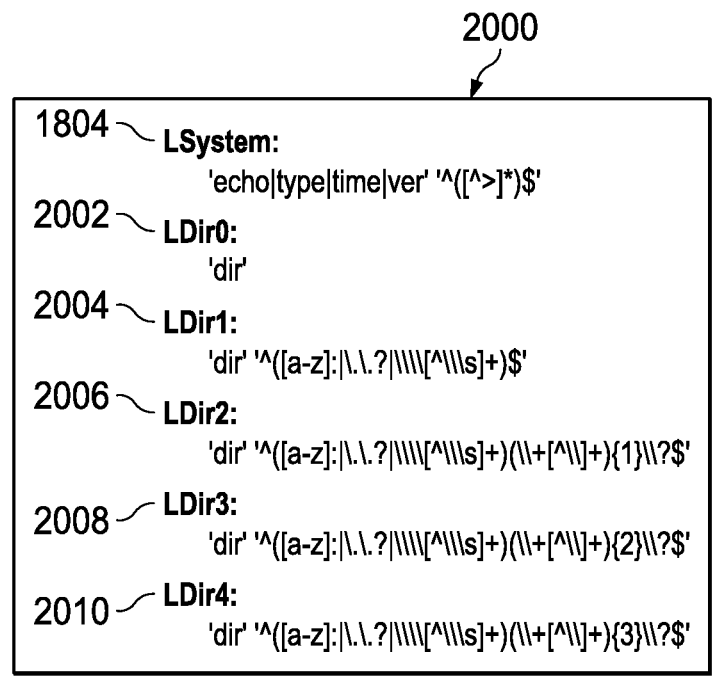
FIG. 20 is an illustration of a partition of LSystem in accordance with an illustrative embodiment.

With reference now to FIG. 20, an illustration of a partition of LSystem is depicted in accordance with an illustrative embodiment. As depicted, partition 2000 depicts a partition of LSystem 1804 into LDir0 2002, LDir1 2004, LDir2 2006, LDir3 2008, and LDir4 2010. This partitioning of LSystem 1804 in partition 2000 may be used to highlight the type of behavior in which the adversary takes actions that examine the local system while remaining in a single directory.

With this partition of the "dir" rule in LSystem 1804 as shown in partition 2000, partition 2000 takes into account the arguments. In partition 2000, the classes LDir0 2002, LDir1 2004, LDir2 2006, LDir3 2008, and LDir4 2010 divide the rules for classifying commands 802 into actions from LSystem 1804 into sets with arguments of differing directory depths.

As depicted, abstraction classes 500 in FIG. 5 with partition 1800 in FIG. 18, partition 2000 in FIG. 20, and ontology 600 in FIG. 6 are used by threat manager 110 to create a new linkograph.

Figure 21:
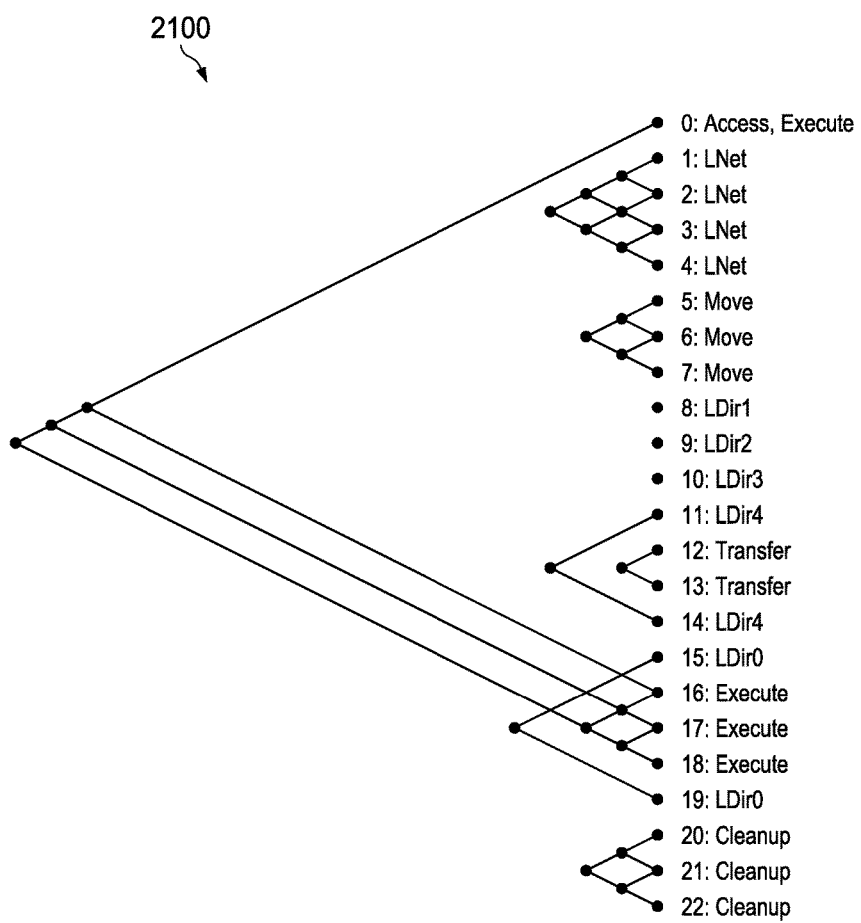
FIG. 21 is an illustration of a linkograph in accordance with an illustrative embodiment.

With reference now to FIG. 21, an illustration of a linkograph is depicted in accordance with an illustrative embodiment. In this illustrative example, linkograph 2100 shows related activities from link (11,14) and link (15,19), where related directory information is verified from actions taken by the adversary. Linkograph 2100 indicates the interleaved actions in nodes 12-13 and nodes 16-18 affected the directory and machine state, making these actions as candidates for closer inspection.

As the number of commands increases, the number of nodes also increases making a visualization of these situations in a list of commands by a human user more difficult. As a result, metrics may be used to quantify the locations of interest and guide the creation of multiple linkographs in a manner that makes managing an attack easier.

C. Using Different Ontologies

As depicted, linkograph 900 in FIG. 9, linkograph 1900 in FIG. 19, and linkograph 2100 in FIG. 21 are created using ontology 600 in FIG. 6, which described self-loops that helped to capture groupings of events. In the illustrative example, ontology 700 in FIG. 7 may be used to obtain more information about actions taken by an adversary.

In the illustrative example, ontology 700 is used to identify forward progress in an attack. As depicted, forward progress occurs when the computer system is modified. For example, with respect to the abstraction classes in abstraction classes 500 in FIG. 5 and ontology 700 in FIG. 7, forward progress occurs when Look 704 is followed by Move 708, Transfer 706, or Execute 710 as shown in ontology 700. Additional Moves, Transfers, or Executes are also signs of progress, as is Cleanup 712 after system modifications.

Strings of similar actions are not considered progress. Strings of similar actions like these may be, for example, two moves in a row or two transfers in a row. These actions may be collapsed by an advanced attacker into a single action.

Figure 22:
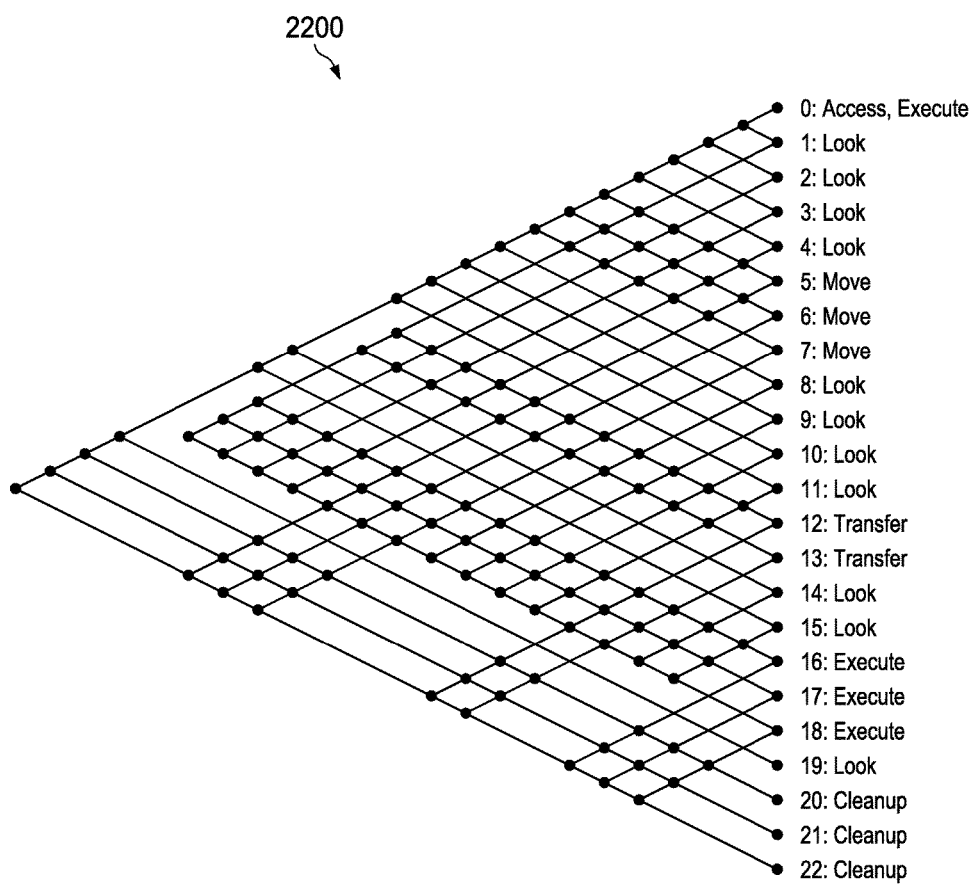
FIG. 22 is an illustration of a linkograph in accordance with an illustrative embodiment.

With reference now to FIG. 22, an illustration of a linkograph is depicted in accordance with an illustrative embodiment. Threat manager 110 creates linkograph 2200 using ontology 700 and abstraction classes 500. In linkograph 2200, the density of links is no longer directly related to the number of commands belonging to the same class of action since self-loops have been eliminated. Rather, the density of links is related to how actions are connected to a set of previous actions. As previously defined, for a given link (i,j), node i is the backlink.

By considering the types of commands that led to a particular node, understanding may be obtained as to how previous actions give rise to a particular action. For example, the backlinks for sub-linkograph SL(5,7) in linkograph 2200 may be examined. This set of nodes in linkograph 2200 is a direct result of the relation Look-Move and, to a lesser extent, Access, Execute→Move. Thus, the sub-linkograph SL(5,7) is a visual representation of how a set of commands for Look actions precipitated action by the attacker in the form of several commands for Move actions.

Two similar sub-linkographs are present in FIG. 22. One sub-linkograph is formed by the set of backlinks for nodes 12 and 13. Another sub-linkograph is one formed by the set of backlinks for nodes 16, 17, and 19. The first of these two sub-linkographs, sub-linkograph SL(12,13), is due to the relations Move→Transfer and Look-Move. As a result, sub-linkograph SL(12,13) is a visual representation of how Look and Move commands resulted in a set of commands for Transfer actions.

Sub-linkograph SL(16,18) in linkograph 2200, on the other hand, is due to the relations Look→Execute, Move→Execute, and Transfer→Execute. Thus, sub-linkograph SL(16,18) visually shows how the set of Execute commands precipitated from the exploration and preparation by the adversary. The exploration may be a Look or Move and the preparation may be a Transfer.

Collectively, these three sub-linkographs indicate a sequence of actions. This sequence of actions includes commands for Look actions followed by commands for Move actions; commands for Look and Move actions followed by commands for Transfer actions; and finally, commands for Look, Move, and Transfer actions followed by Execute actions. Whereas the PercentageOfLinks from linkograph 900 in FIG. 9 and table 1700 in FIG. 17 illustrate the individual phases of activity, the sub-linkographs in linkograph 2200 show the dynamics of moving from one activity to another. Just as with linkograph 900 in FIG. 9, finding the sub-linkographs with the highest value of PercentageOfLinks is insightful.

Figure 23:
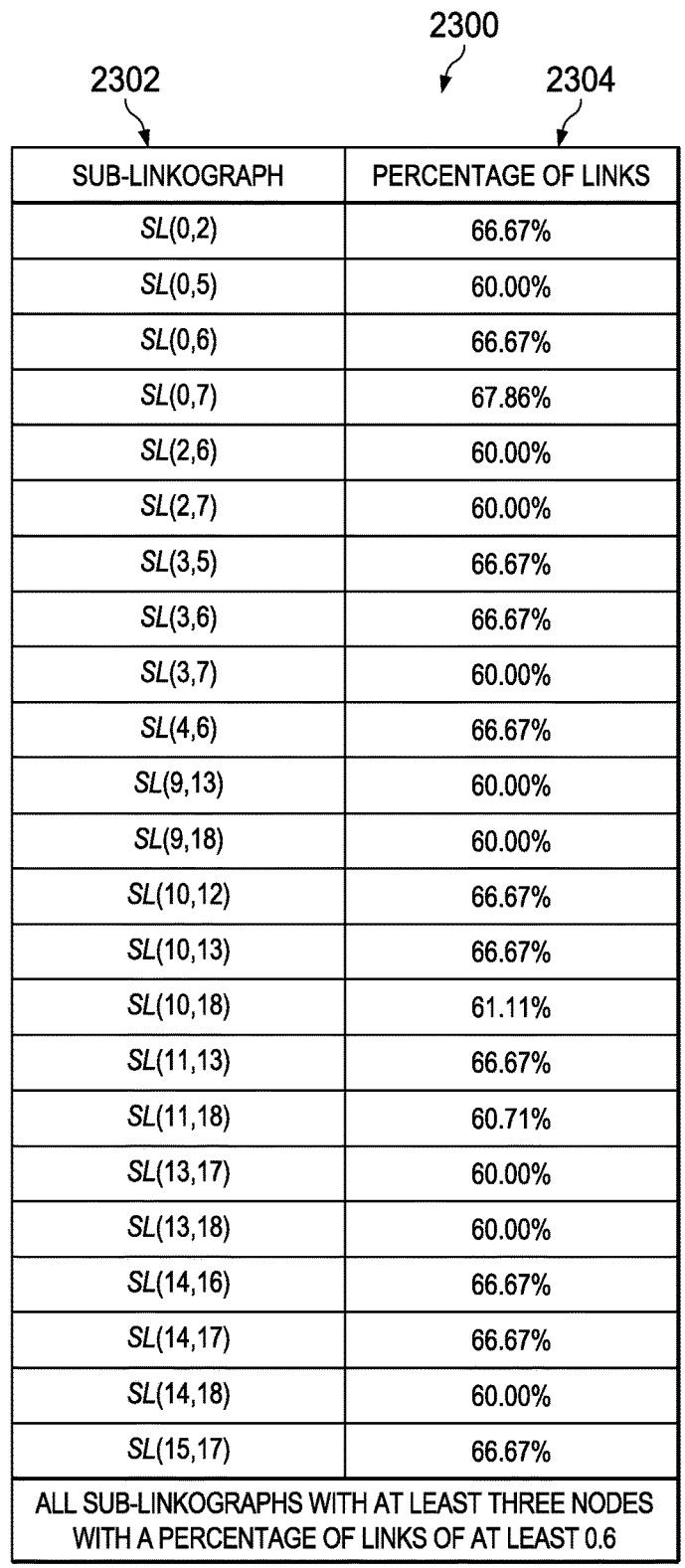
FIG. 23 is an illustration of a table of sub-linkographs in a linkograph in accordance with an illustrative embodiment.

With reference now to FIG. 23, an illustration of a table of sub-linkographs in the linkograph in FIG. 22 is depicted in accordance with an illustrative embodiment. As depicted, table 2300 shows the sub-linkographs with at least three nodes and a PercentageOfLinks of at least 60 percent. Column 2302 is the sub-linkographs, and column 2304 is the percentage of links.

In table 2300, sub-linkograph SL(3,7), sub-linkograph SL(9,13), and sub-linkograph SL(14,18) roughly correspond to the manually identified sub-linkographs. However, unlike linkograph 900, taking the maximal sub-linkographs is not as helpful since one would only get sub-linkograph SL(0,7) and sub-linkograph SL(9,18), which conflates the sub-linkographs and does not identify interesting transition points.

In order to further narrow the analysis in this example, the process takes into account the fact that the links are not relating similar actions, but actions that led to subsequent are taken into account. Since sub-linkographs are based on how connected or related a node is to its predecessors, the function BackLinkPercent(a) in the metric Back Link Percent 406, may be used. This metric gives the ratio of backlinks present versus the possible backlinks for node a. Nodes heavily dependent on previous actions may be identified by considering only nodes where the BackLinkPercent (a) is at least 70 percent.

With reference now to FIG. 24, an illustration of a table of backlink percent nodes is depicted in accordance with an illustrative embodiment. In table 2400, column 2402 is the node numbers, and column 2404 is the backlink percent for a node number.

Table 2400 shows which nodes have a BackLinkPercent of at least 70 percent. This type of consideration allows identifying the nodes 5, 6, 7, 12, 13, 16, 17, and 19. These nodes are the same nodes that make up the previously manually-identified sub-linkograph SL(5,7), sub-linkograph SL(12,13), and sub-linkograph SL(15,18).

Once interest regions in linkograph 2200 are identified using the statistics provided using the metric Percentage Of Links 402 and the metric Back Link Percent 406, an understanding of the transition between activities and the information encoded in these transitions is desired. The metric Shannon Entropy 408 is used to achieve this understanding.

With reference now to FIG. 25, an illustration of a table of sub-linkographs having nodes with a Shannon entropy of 1 is shown. In table 2500, column 2502 shows sub-linkographs and column 2504 shows the Shannon entropy number.

As depicted, table 2500 shows sub-linkographs in linkograph 2200 in which the sub-linkographs have a Shannon entropy that is at least 1. In this illustrative example, sub-linkographs of interest are sub-linkograph SL(2,5), sub-linkograph SL(9,12), and sub-linkograph SL(13,16). These sub-linkographs are all related to the previous sublinkographs in that each of the new sub-linkographs are for actions that resulted in the sub-linkographs identified using Back Link Percent 406. Using the regions identified by Back Link Percent 406 and further highlighted by Shannon Entropy 408, critical transitions in linkograph 2200 and behavior of the adversary may be identified and used to manage an attack. The attack may be a present attack or a future attack.

V. Honeycue Placement

Tools that may be used as a result of analyzing an attack using linkographs include honeypots, honeynets, and honeytokens. These tools may be used to at least one of confuse, slow, or detect adversaries that attack a computer system. Currently, the placement of these defensive tools is typically agnostic of the patterns, goals, and interests of the adversaries.

In the illustrative example, information is analyzed to further an understanding of an adversary. In this example, the adversary followed a sequence of actions such as Look, Move, Look, Transfer, Look, Execute, and Cleanup. Information was also extracted by looking at sets of sub-linkographs. The examination found three primary sets of actions. The sets of actions include Look and then Move; Look and then Transfer; and Look and Execute.

Threat manager 110 may identify a protective action such as the placement of a special type of honeytoken called a honeycue. A honeycue is a piece of information designed to influence subsequent moves made by an attacker. This piece of information may include a file, a symbolic link, or some other suitable piece of information that may be of interest to an adversary. Thus, placement may result in at least one of delaying, disrupting, or manipulating an attack.

With reference again to linkogragph 2200 in FIG. 22, the sub-linkograph SL(12,13) is created by the commands that are classified as the actions Look and Move being followed by a Transfer. The sub-linkograph is the result of looking at a sequence of progressively deeper directories and then downloading some information to the system. If the "ftp" and "scp" commands 802 in list 800 in FIG. 8 are split into an abstraction class Transfer, then the resulting sub-linkographs from the relations Look→Transfer and Move→Transfer measure the behavior of looking around and then taking information by the adversary.

Figure 26:
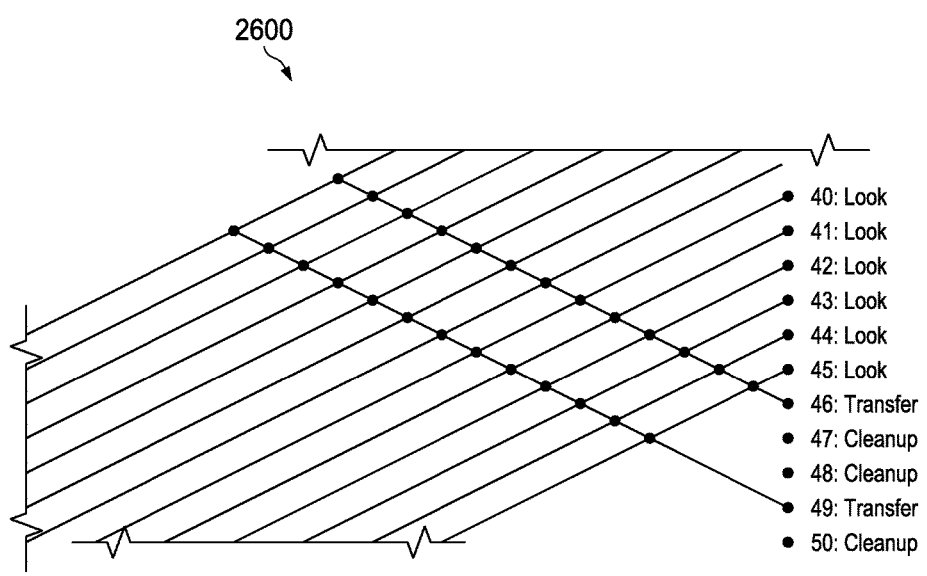
FIG. 26 is an illustration of a portion of a linkograph in accordance with an illustrative embodiment.

With reference next to FIG. 26, an illustration of a portion of a linkograph is depicted in accordance with an illustrative embodiment. Linkograph 2600 shows an example of this type of pattern of behavior. Threat manager 110 or a human user may look for patterns such as in FIG. 26 and present a false file to the adversary attacker after the adversary has copied two or three files.

After previously copied files have been established to be genuine, some trust has been established that other files may also be genuine. As a result, the adversary may tend to be less critical of new information that is presented in subsequent files. Moreover, once an adversary has started copying files, a tendency is present to want to copy additional files.

In the illustrative example, the function BackLinkPercent (node) for metric Back Link Percent 406 may be used to identify the sub-linkographs where files are being transferred. Thus, linkographs may be created based on the relations Look→Transfer and Move→Transfer. A honeycue may be placed at times when the adversary is looking through files and transferring. This timing may be especially suitable once a file has already been transferred.

Thus, the illustrative embodiments provide a method and apparatus for managing an attack by an adversary. One or more illustrative examples provide one or more technical solutions that overcome the technical problem with obtaining information about an adversary to mitigate a current attack or prevent future attacks on a computer network. A technical effect occurring from one or more technical solutions is an approach that provides improved information about the actions of an adversary. The use of graphs that shows a number of patterns of behavior for the adversary may allow for an improved response when identifying and taking a protective action with respect to a computer system.

In this manner, an illustrative example provides a formalized, mathematical definition of a linkograph. Additionally, the illustrative example provides a framework for the automatic generation of linkographs from raw event data. The illustrative example includes an abstraction model used to examine and aggregate actions taken by the attacker and an ontological model that describes the general form and flow of an attack on a computer system. As depicted, linkography may be used to analyze the behavior of an attacker and draw subsequent conclusions from this behavior. With the analysis, a protective action may be identified and performed. For example, the linkographs may be used to identify a placement of a honeytoken in the form of a honeycue. The honeycue may be placed to influence subsequent actions performed by an adversary in a manner that delays or disrupts an attack. These and other technical effects may occur as a result of using one or more of the technical solutions in the illustrative examples.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing an attack on a computer system, the method comprising:
    identifying, by a computer, actions taken by an adversary in the computer system;
    identifying, by the computer, links connecting the actions over time using an ontology defining linking rules for linking the actions over time;
    creating, by the computer, a graph of the actions with the links connecting the actions over time, wherein the graph shows a number of patterns of behavior for the adversary, and wherein the graph is a linkograph;
    identifying, by the computer, a protective action to take with respect to the computer system using the graph of the actions taken by the adversary;
    identifying, by the computer, a number of linkographs that are possible from the actions taken by the adversary and the linking rules in the ontology;
    identifying, by the computer, metrics for the number of linkographs that indicate a likelihood that the actions taken by the adversary is the attack, wherein the metrics are selected from at least one of a ratio of links in the linkograph to total possible links, a ratio of the commands in the event data that belong to an action in an abstraction class to a subset of the commands in the event data, a ratio of backlinks present in the linkograph for the actions in the linkograph to a number of possible back links in the linkograph, or Shannon entropy for each possible sub-linkograph in the linkograph; and
    wherein creating, by the computer, the linkograph of the actions with the links connecting the actions over time comprises identifying, by the computer, the linkograph based on the metrics for the number of linkographs.

2. The method of claim 1, wherein identifying, by the computer, the actions taken by the adversary in the computer system comprises:
    receiving, by the computer, event data associated with the attack on the computer system;
    identifying, by the computer, commands in the event data; and
    identifying, by the computer, actions from the commands using a set of abstraction rules.

3. The method of claim 2 further comprising:
    anonymizing, by the computer, the event data to form anonymized event data, wherein the anonymized event data is used in analyzing the attack.

4. The method of claim 1, wherein the ontology is a first ontology and further comprising:
    receiving, by the computer, a selection of a second ontology;
    identifying, by the computer, the links connecting the actions over time using the second ontology when a second set of linking rules is selected; and
    creating, by the computer, a second graph of the actions with second links connecting the actions over time, wherein the second graph shows a second number of patterns of behavior for the adversary.

5. The method of claim 1 further comprising:
    performing, by the computer, the protective action identified with respect to the computer system.

6. The method of claim 1, wherein the protective action is selected from one of using a defensive tool, placing a honeytoken, and placing a honeycue.

7. The method of claim 1, wherein the actions are selected from at least one of a Look, a Move, a Transfer, an Execute, or a Cleanup.

8. The method of claim 1, wherein the steps are performed during a time selected from at least one of during the attack or after the attack.

9. The method of claim 1, wherein the graph is selected from a group comprising a linkograph, a state diagram, and a Markov chain.

10. An apparatus comprising:
    a computer, comprising a processor, configured to implement a threat manager that identifies actions taken by an adversary in a computer system; identifies links connecting the actions over time using an ontology defining linking rules for linking the actions; creates a graph of the actions with the links connecting the actions over time, the graph being a linkograph, wherein the graph shows a number of patterns of behavior for the adversary; identifies a protective action to take with respect to the computer system using the graph of the actions taken by the adversary; identify, by the computer, a number of linkographs that are possible from the actions taken by the adversary and the linking rules in the ontology; identify, by the computer, metrics for the number of linkographs that indicate a likelihood that the actions taken by the adversary is the attack, wherein the metrics are selected from at least one of a ratio of links in the linkograph to total possible links, a ratio of the commands in the event data that belong to an action in an abstraction class to a subset of the commands in the event data, a ratio of backlinks present in the linkograph for the actions in the linkograph to a number of possible back links in the linkograph, or Shannon entropy for each possible sub-linkograph in the linkograph; and wherein the threat manager creates the linkograph of the actions with the links connecting the actions over time by identifying the linkograph based on the metrics for the number of linkographs.

11. The apparatus of claim 10, wherein in identifying the actions taken by the adversary in the computer system, the threat manager receives event data associated with an attack on the computer system; identifies commands in the event data; and identifies the actions from the commands using a set of abstraction rules.

12. The apparatus of claim 11, wherein the threat manager anonymizes the event data to form anonymized event data, wherein the anonymized event data is used in analyzing the attack.

13. The apparatus of claim 10, wherein the ontology is a first ontology and the threat manager receives a selection of a second ontology and identifies the links connecting the actions over time using the second ontology when a second set of linking rules is selected.

14. The apparatus of claim 10, wherein the threat manager performs the protective action identified with respect to the computer system.

15. The apparatus of claim 10, wherein the protective action is selected from one of using a defensive tool, placing a honeytoken, and placing a honeycue.

16. The apparatus of claim 10, wherein the actions are selected from at least one of a Look, a Move, a Transfer, an Execute, or a Cleanup.

17. The apparatus of claim 10, wherein the threat manager operates during a time selected from at least one of during an attack or after the attack.

18. The apparatus of claim 10, wherein the graph is selected from a group comprising a linkograph, a state diagram, and a Markov chain.

19. A computer program product for managing an attack on a computer system, the computer program product comprising:
a computer readable storage media;
first program code, stored on the computer readable storage media, for identifying actions taken by an adversary in the computer system;
second program code, stored on the computer readable storage media, for identifying links connecting the actions over time using an ontology defining linking rules for linking the actions;
third program code, stored on the computer readable storage media, for creating a graph of the actions with the links connecting the actions over time, wherein the graph shows a number of patterns of behavior for the adversary, and wherein the graph comprises a linkograph; and
fourth program code, stored on the computer readable storage media, for identifying a protective action to take with respect to the computer system using the graph of the actions taken by the adversary;
fifth program code, stored on the computer readable storage media, for identifying, by the computer, a number of linkographs that are possible from the actions taken by the adversary and the linking rules in the ontology;
sixth program code, stored on the computer readable storage media, for identifying, by the computer, metrics for the number of linkographs that indicate a likelihood that the actions taken by the adversary is the attack, wherein the metrics are selected from at least one of a ratio of links in the linkograph to total possible links, a ratio of the commands in the event data that belong to an action in an abstraction class to a subset of the commands in the event data, a ratio of backlinks present in the linkograph for the actions in the linkograph to a number of possible back links in the linkograph, or Shannon entropy for each possible sub-linkograph in the linkograph; and
wherein the program code for creating, by the computer, the linkograph of the actions with the links connecting the actions over time comprises program code for identifying, by the computer, the linkograph based on the metrics for the number of linkographs.

20. The computer program product of claim 19, wherein the first program code comprises:
program code, stored on the computer readable storage media, for receiving event data associated with the attack on the computer system;
program code, stored on the computer readable storage media, for identifying commands in the event data; and
program code, stored on the computer readable storage media, for identifying actions from the commands using a set of abstraction rules.

21. The computer program product of claim 20 further comprising:
fifth program code, stored on the computer readable storage media, for anonymizing the event data to form anonymized event data, wherein the anonymized event data is used in analyzing the attack.

22. The computer program product of claim 19, wherein the ontology is a first ontology and further comprising:
fifth program code, stored on the computer readable storage media, for receiving a selection of a second ontology; and
sixth program code, stored on the computer readable storage media, for identifying the links connecting the actions over time using the second ontology when a second set of linking rules is selected.

23. The computer program product of claim 19 further comprising:
fifth program code, stored on the computer readable storage media, for performing the protective action identified with respect to the computer system.

24. The computer program product of claim 19, wherein program codes are run during a time selected from at least one of during the attack or after the attack.

* * * * *